United States Patent
Ma et al.

(10) Patent No.: US 8,858,827 B2
(45) Date of Patent: Oct. 14, 2014

(54) WATER TREATMENT AGENT FOR REMOVING POLLUTANT BY REINFORCING POTASSIUM PERMANGANATE WITH INTERMEDIATE MANGANES

(75) Inventors: Jun Ma, Heilongjiang (CN); Jin Jiang, Heilongjiang (CN); Pang Suyan, Heilongjiang (CN); Liu Zenghe, Heilongjiang (CN)

(73) Assignee: Harbin Institute of Technology, Harbin, Heilongjiang (CN)

( * ) Notice: Subject to any disclaimer, the term of this patent is extended or adjusted under 35 U.S.C. 154(b) by 785 days.

(21) Appl. No.: 12/737,846

(22) PCT Filed: Jun. 8, 2009

(86) PCT No.: PCT/CN2009/072057
§ 371 (c)(1),
(2), (4) Date: Mar. 25, 2011

(87) PCT Pub. No.: WO2010/102467
PCT Pub. Date: Sep. 16, 2010

(65) Prior Publication Data
US 2011/0260098 A1    Oct. 27, 2011

(30) Foreign Application Priority Data

Mar. 13, 2009 (CN) .......................... 2009 1 0071529

(51) Int. Cl.
*C02F 1/68* (2006.01)
*C02F 1/72* (2006.01)
*C02F 101/30* (2006.01)

(52) U.S. Cl.
CPC . *C02F 1/683* (2013.01); *C02F 1/72* (2013.01); *C02F 2101/30* (2013.01)
USPC ............................ 252/181; 252/175; 252/180

(58) Field of Classification Search
CPC ... C02F 1/72; C02F 2305/02; C02F 2305/023
USPC .......................................... 252/175, 180, 181
See application file for complete search history.

(56) References Cited

FOREIGN PATENT DOCUMENTS

CN          1103628 A    *   6/1995

OTHER PUBLICATIONS

English machine translation of CN 1103628 A (1995).*

* cited by examiner

*Primary Examiner* — Peter F Godenschwagner
(74) *Attorney, Agent, or Firm* — Raymond Y. Chan; David and Raymond Patent Fiem

(57) ABSTRACT

A water treatment agent for removing pollutant by reinforcing potassium permanganate with intermediate manganese consists of a potassium permanganate and a chelating agent, or, alternatively, consists of a potassium permanganate, a chelating agent and an inducer. The chelating agent is capable of forming a coordination complex with the intermediate manganese which is produced during the reaction of potassium permanganate and organic substance. Thus self decomposition of intermediate manganese is reduced so that the effective utilization rate is increased and the capability for potassium permanganate to degrade organic pollutants is enhanced. The inducer accelerates the production of the intermediate manganese and increases the utilization rate so that the capability of potassium permanganate for degrading the organic pollutants is further enhanced.

10 Claims, 1 Drawing Sheet

WATER TREATMENT AGENT FOR REMOVING POLLUTANT BY REINFORCING POTASSIUM PERMANGANATE WITH INTERMEDIATE MANGANES

BACKGROUND OF THE PRESENT INVENTION

1. Field of Invention

The present invention relates to a water treatment agent.

2. Description of Related Arts

With the thriving of industrial and farming industry, a large amount of poisonous and toxic refractory organic pollutants are discharged into the water system, resulting in a heavy pollution of the surface water and ground water and making the water quality getting worse and worse. Currently, a common solution is to employ an oxidizing process to remove the organic pollutants in water using oxidization agent such as chlorine, chlorine dioxide, hydrogen peroxide, ozone, potassium permanganate and so on. Accordingly, the redox potential of chlorine, chlorine dioxide, hydrogen peroxide, ozone and potassium permanganate is 1.36V, 1.50V, 1.77V, 2.07V and 1.69V respectively.

It is recognized that ozone is advantageous with the highest redox potential, the strongest oxidability and is also friendly to aqueous solution, but the investment and cost for maintaining the oxidizing process is relatively high. Although the oxidability of hydrogen peroxide itself is not very strong, high active hydroxyl radicals will be produced when hydrogen peroxide is simultaneously present with Fe(II) in an acidic condition, thus providing a strong oxidability (with a typical redox potential of 2.8V). However, the pH value of the aqueous reaction system should be monitored and adjusted during the whole reaction process, making the process very complicated and hard to control. Chlorine dioxide is a strong disinfectant, but during the reaction with organic substance, it is reduced to provide chlorous ion which is destructive to human red blood cells. Thus, there is a safety risk for the use of chlorine dioxide. Chloride does oxidize the organic substance to some extent and has long been employed as a pretreatment oxidization agent for water treatment. However, chloride reacts with various kinds of organic pollutants and produces a lot of halogenated byproducts which are harmful to human body. Therefore, the use of chloride for pretreatment is gradually restricted in practice.

Potassium permanganate has a relatively higher oxidability for removing the organic pollutants in water and does not produce poisonous and toxic byproducts. Furthermore, the cost for the basic infrastructure is relatively low, the requirement for the equipment is not very high and it is also convenient for operation and management. Therefore, potassium permanganate is a preferred choice in practice. However, potassium permanganate has a high selectivity and can only remove organic substance with unsaturated functional groups such as alkene and phenol. In other words, potassium permanganate has a low activity for oxidization of poisonous and toxic refractory organic pollutants. But high active intermediate manganese is produced during the oxidization process. Accordingly, the intermediate manganese has a relatively high redox potential and reacts quickly so as to degrade organic substance. But the high active intermediate manganese exists in a very short period of time and may decompose itself. Therefore, the effective utilization rate is low and the oxidization ability of the intermediate manganese need to be exploited.

SUMMARY OF THE PRESENT INVENTION

The invention is advantageous in that it provides a water treatment agent for removing pollutant by reinforcing potassium permanganate with intermediate manganese. Thus the problems for using potassium permanganate as a water treatment agent such as only removing organic substance with unsaturated functional groups, having low activity for oxidization of poisonous and toxic refractory organic pollutants, high active intermediate manganese may easy to decompose itself and the low effective utilization rate are solved.

Additional advantages and features of the invention will become apparent from the description which follows, and may be realized by means of the instrumentalities and combinations particular point out in the appended claims.

According to a first preferred embodiment of the present invention, the water treatment agent for removing pollutant by reinforcing potassium permanganate with intermediate manganese consists of a potassium permanganate and a chelating agent, wherein the mass ratio of the potassium permanganate and the chelating agent is 1:0.5~50.

According to a first preferred embodiment of the present invention, the water treatment agent for removing pollutant by reinforcing potassium permanganate with intermediate manganese consists of a potassium permanganate, a chelating agent and an the inducer, wherein the mass ratio of the potassium permanganate, the chelating agent and inducer is 1:0.5~50:0.1~1.

The chelating agent of the water treatment agent according to the first preferred embodiment is capable of forming a coordination complex with the intermediate manganese which is produced during the reaction of potassium permanganate and organic substance. Thus the presence of intermediate manganese is stably maintained, and the self decomposition of intermediate manganese is reduced so that the effective utilization rate is increased and the capability for potassium permanganate to degrade organic pollutants is enhanced. Because the intermediate manganese can stably exist in the aqueous system, poisonous and toxic refractory organic pollutants are oxidized and removed, and can be completely eliminated from the aqueous system by the subsequent water treatment procedure.

The inducer of the water treatment agent according to the second preferred embodiment is capable of accelerating the production of the intermediate manganese. Therefore, the water treatment agent according to the second preferred embodiment not only increases the producing speed of the intermediate manganese but also increases the utilization rate so that the capability of potassium permanganate for degrading the organic pollutants is further enhanced.

The two water treatment agents of present invention both can degrade poisonous and toxic refractory organic pollutants in aqueous system. Accordingly, high active intermediate manganese degrades the organic substance and produce final products of colloid manganese dioxide in a nascent state. The colloid manganese dioxide is suitable for the forming of flocculates and thus the coagulation and flocculation effect is enhanced.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
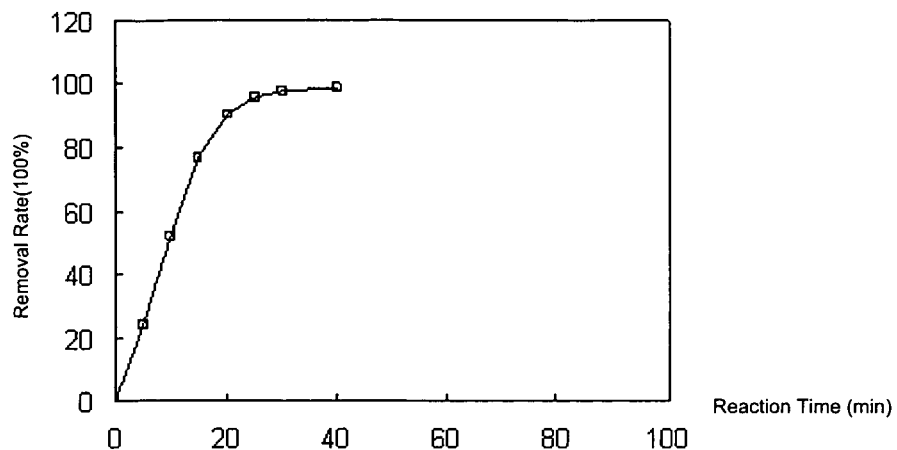
FIG. 1 is a schematic view according to a ninth preferred embodiment of the present invention, illustrating the variation of 2,4-Dichlorophenol removal rate of the first waste water sample corresponding to the reaction time.

One skilled in the art will understand that the embodiments of the present invention as shown in the drawings and described below is exemplary only and not intended to be limiting. The embodiments have been shown and described for the purposes of illustrating the functional and structural principles of the present invention and is subject to combine or change without departure from such principles.

The water treatment agent for enhancing pollutants removal by intermediate manganese of potassium permanganate according to a first preferred embodiment of the present invention is consisted of potassium permanganate and chelating agent, wherein the mass ratio of potassium permanganate and chelating agent is 1:0.5~50.

The method employing the water treatment agent of this preferred embodiment for water treatment comprises the following steps: a) Adding water treatment agent of the present invention into the waste water, maintaining the initial concentration of potassium permanganate to 0.1~15 mg/L and the hydraulic retention time to 1~60 min; b) Coagulating and flocculating the resulting water of step a); c) Purifying the resulting water of step b) with a biological activated carbon adsorbing process and a subsequent filtrating process; d) Disinfecting the resulting water of step c) to obtain purified water; wherein the waste water of step a) is polluted water which has not undergone the coagulation and flocculation process or secondary water from the water treatment plant.

The method employing the water treatment agent of this preferred embodiment for water treatment can be also carried out in the following steps: a) Coagulating and flocculating the resulting waste water, adding water treatment agent of the present invention into the resulting water, maintaining the initial concentration of potassium permanganate to 0.1~15 mg/L and the hydraulic retention time to 1~60 min; b) Purifying the resulting waste water of step a) with a biological activated carbon adsorbing process and a subsequent filtrating process; c) Disinfecting the resulting water of step b) to obtain purified water; wherein the waste water of step a) is polluted water which has not undergone the coagulation and flocculation process or secondary water from the water treatment plant. Wherein biological activated carbon is activate carbon with biological membranes, and step c) can cooperates with an aeration process; the adding amount of water treatment agent and the hydraulic retention time can be varied according to the actual situation.

Accordingly, the removal efficiency of the water treatment agent according to this preferred embodiment of the present invention maintains stable under an aqueous environment with pH value of 5~9 and temperature of 5~40° C.

According to a large number of experiments, after a 30 min sufficient interaction (i.e. hydraulic retention time of 30 min) with the water treatment agent according to this preferred embodiment of the present invention, the concentration of phenol in the waste water is reduced by 60.0%~90.0%, the concentration of 2-chlorophenol in the waste water is reduced by 80.0%~90.0%, the concentration of 3-chlorophenol in the waste water is reduced by 80.0%~90.0%, the concentration of 4-chlorophenol in the waste water is reduced by 80.0%~90.0%, the concentration of 2,4-dichlorophenol in the waste water is reduced by 80.0%~90.0%, the concentration of 2,4,6-trichlorophenol in the waste water is reduced by 80.0%~90.0%, the concentration of pentachlorophenol in the waste water is reduced by 70.0%~90.0%, the concentration of p-hydroxybenzoic acid in the waste water is reduced by 70.0%~90.0%, the concentration of bisphenol A in the waste water is reduced by 90.0%~99.9%, the concentration of nonylphenol in the waste water is reduced by 90.0%~99.9%, the concentration of estradiol in the waste water is reduced by 90.0%~99.9%, the concentration of estrone in the waste water is reduced by 90.0%~99.9%, the concentration of nitrophenol in the waste water is reduced by 70.0%~80.0%, the concentration of chloramine in the waste water is reduced by 70.0%~90.0%, the concentration of aniline in the waste water is reduced by 70.0%~90.0%, the concentration of triclosan in the waste water is reduced by 90.0%~99.9%, the concentration of pyrene in the waste water is reduced by 50.0%~70.0%, the concentration of carbamazepine in the waste water is reduced by 80.0%~99.9%, and the $BOD_5$/COD ratio in the waste water is greatly increased ($BOD_5$ is Biochemical Oxygen Demand in five days, COD is Chemical Oxygen Demand).

According to a second preferred embodiment of the present invention, the water treatment agent is similar to the water treatment agent of the above first preferred embodiment except that the mass ratio of potassium permanganate and chelating agent is 1:1~40.

According to a large number of experiments, after a 30 min sufficient interaction (i.e. hydraulic retention time of 30 min) with the water treatment agent according to the second preferred embodiment of the present invention, poisonous and toxic refractory organic pollutants in the waste water is greatly decreased, and the $BOD_5$/COD ratio is higher than 0.424.

According to a third preferred embodiment of the present invention, the water treatment agent is similar to the water treatment agent of the above first preferred embodiment except that the mass ratio of potassium permanganate and chelating agent is 1:10~30.

According to a large number of experiments, after a 30 min sufficient interaction (i.e. hydraulic retention time of 30 min) with the water treatment agent according to the third preferred embodiment of the present invention, poisonous and toxic refractory organic pollutants in the waste water is greatly decreased, and the $BOD_5$/COD ratio is higher than 0.437.

According to a fourth preferred embodiment of the present invention, the water treatment agent is similar to the water treatment agent of the above first preferred embodiment except that the mass ratio of potassium permanganate and chelating agent is 1:15~25.

According to a large number of experiments, after a 30 min sufficient interaction (i.e. hydraulic retention time of 30 min) with the water treatment agent according to the fourth preferred embodiment of the present invention, poisonous and toxic refractory organic pollutants in the waste water is greatly decreased, and the $BOD_5$/COD ratio is higher than 0.502.

According to a fifth preferred embodiment of the present invention, the water treatment agent is similar to the water treatment agent of the above first preferred embodiment except that the mass ratio of potassium permanganate and chelating agent is 1:2.

According to a large number of experiments, after a 30 min sufficient interaction (i.e. hydraulic retention time of 30 min)

with the water treatment agent according to the fifth preferred embodiment of the present invention, poisonous and toxic refractory organic pollutants in the waste water is greatly decreased, and the $BOD_5/COD$ ratio is higher than 0.418.

According to a sixth preferred embodiment of the present invention, the water treatment agent is similar to the water treatment agent of the above first preferred embodiment except that the mass ratio of potassium permanganate and chelating agent is 1:30~45.

According to a large number of experiments, after a 30 min sufficient interaction (i.e. hydraulic retention time of 30 min) with the water treatment agent according to the sixth preferred embodiment of the present invention, poisonous and toxic refractory organic pollutants in the waste water is greatly decreased, and the $BOD_5/COD$ ratio is higher than 0.424.

According to a seventh preferred embodiment of the present invention, the water treatment agent is similar to the water treatment agent of the above first, second, third, fourth, fifth and sixth preferred embodiment except that chelating agent is selected from the group consisting of inorganic chelating agent, chelating agent, micromolecule carboxylic acid, amino acid, aminopolycarboxylate, macromolecular carboxylic acid, synthetic macromolecular chelating agent, algae, polyoxometalate (POM), activated carbon with carboxyl functional group on the surface thereof, activated carbon with hydroxyl group on the surface thereof, activated carbon with carbonyl functional group on the surface thereof, activated carbon with alcohol functional group on the surface thereof, activated carbon with pyrrolidinyl functional group on the surface thereof, activated carbon with furan functional group on the surface thereof, activated carbon with pyridyl functional group on the surface thereof and anion exchange resin.

Accordingly, activated carbon with carboxyl functional group on the surface thereof, activated carbon with hydroxyl group on the surface thereof, activated carbon with carbonyl functional group on the surface thereof, activated carbon with alcohol functional group on the surface thereof, activated carbon with pyrrolidinyl functional group on the surface thereof, activated carbon with furan functional group on the surface thereof and activated carbon with pyridyl functional group on the surface thereof and anion exchange resin is capable of chelating with intermediate manganese via the functional group. What's more, these chelating agents also function as an inducer because the reducibility of these chelating agents themselves can accelerate the production of intermediate manganese.

According to an eighth preferred embodiment of the present invention, the water treatment agent is similar to the water treatment agent of the above seventh preferred embodiment except that the chelating agent is phosphate, pyrophosphate and/or polyphosphate.

According to a ninth preferred embodiment of the present invention, the water treatment agent is similar to the water treatment agent of the above fifth preferred embodiment except that the chelating agent is phosphate.

2,4-dichlorophenol is a common and typical poisonous and toxic refractory organic pollutant. In this embodiment, adding appropriate amount of 2,4-dichlorophenol into water so as to prepare a waste water sample with 1.0 mg/L 2,4-dichlorophenol (pH value of the waste water sample is about 6.0).

The experiment is carried out in the following manner so as to research the efficiency of waste water treatment agent of the present invention in contrast to the conventional potassium permanganate.

The first group: adding the water treatment agent according to this ninth preferred embodiment of the present invention into the waste water sample, adjusting the initial concentration of the potassium permanganate to 10 mg/l and controlling the hydraulic retention time to 40 min.

The second group: adding potassium permanganate into the waste water sample, adjusting the initial concentration of the potassium permanganate to 10 mg/l and controlling the hydraulic retention time to 90 min.

Figure 2:
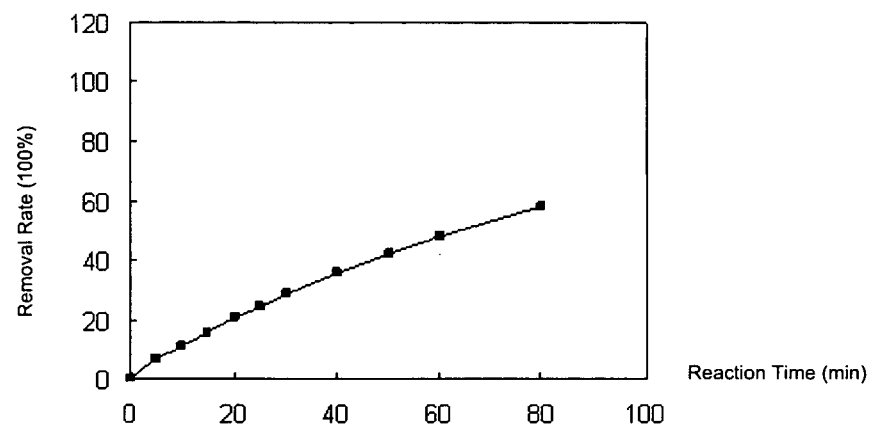
FIG. 2 is a schematic view according to the ninth preferred embodiment of the present invention, illustrating the variation of 2,4-Dichlorophenol removal rate of the second waste water sample corresponding to the reaction time.

FIG. 1 is a schematic view according to a ninth preferred embodiment of the present invention, illustrating the variation of 2,4-dichlorophenol removal rate of the first waste water sample corresponding to the reaction time; FIG. 2 is a schematic view according to the ninth preferred embodiment of the present invention, illustrating the variation of 2,4-dichlorophenol removal rate of the second waste water sample corresponding to the reaction time.

Referring to FIG. 1 and FIG. 2, it is obvious that the water treatment agent for enhancing pollutants removal by intermediate manganese of potassium permanganate of this preferred embodiment functions better and faster than potassium permanganate in removing the poisonous and toxic refractory organic pollutants in the waste water sample.

Accordingly, the 2,4-dichlorophenol removal rate of the first group using the water treatment agent of this preferred embodiment of the present invention for a reaction time of 30 min is as high as 99.9%, while the 2,4-dichlorophenol removal rate of the second group using potassium permanganate for a reaction time of 30 min is just 30.0% and about 60.0% for a reaction time of 80 min.

According to a tenth preferred embodiment of the present invention, the water treatment agent is similar to the water treatment agent of the above fifth preferred embodiment except that the chelating agent is polyphosphate.

According to a large number of experiments on the waste water samples (pH≈6.5), after a 25 min sufficient interaction (i.e. hydraulic retention time of 25 min) with the water treatment agent according to this tenth preferred embodiment of the present invention, the concentration of phenol in the waste water is reduced by 74.0%~90.0%, the concentration of 2-chlorophenol in the waste water is reduced by 81.4%~90.0%, the concentration of 3-chlorophenol in the waste water is reduced by 81.5%~90.0%, the concentration of 4-chlorophenol in the waste water is reduced by 81.3%~90.0%, the concentration of 2,4-dichlorophenol in the waste water is reduced by 85.8%~94.8%, the concentration of 2,4,6-trichlorophenol in the waste water is reduced by 74.4%~90.0%, the concentration of pentachlorophenol in the waste water is reduced by 75.1%~90.0%, the concentration of p-hydroxybenzoic acid in the waste water is reduced by 75.0%~99.9%, the concentration of bisphenol A in the waste water is reduced by 92%~99.9%, the concentration of nonylphenol in the waste water is reduced by 92.4%~99.9%, the concentration of estradiol in the waste water is reduced by 92.1%~99.9%, the concentration of estrone in the waste water is reduced by 92.4%~99.9%, the concentration of nitrophenol in the waste water is reduced by 71.4%~80.0%, the concentration of chloramine in the waste water is reduced by 74.3%~90.0%, the concentration of aniline in the waste water is reduced by 71.8%~90.0%, the concentration of triclosan in the waste water is reduced by 93%~99.9%, the concentration of pyrene in the waste water is reduced by 54.6%~70.0%, the concentration of carbamazepine in the waste water is reduced by 82.7%~99.9%, and the $BOD_5/COD$ ratio in the waste water is increased to higher than 0.418.

According to an 11th preferred embodiment of the present invention, the water treatment agent is similar to the water treatment agent of the above fifth preferred embodiment except that the chelating agent is pyrophosphate and polyphosphate.

According to a large number of experiments on the waste water samples (pH≈7.0), after a 30 min sufficient interaction with the water treatment agent according to this 11th preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene and carbamazepine are reduced by 74.3%~90.0%, 81.3%~90.0%, 81.6%~90.0%, 81.5%~90.0%, 85.9%~95.4%, 74.3%~90.0%, 75.0%~90.0%, 75.3%~90.0%, 92.2%~99.9%, 92.2%~99.9%, 91.8%~99.9%, 92.3%~99.9%, 71.3%~80.0%, 74.2%~90.0%, 71.9%~90.0%, 93.1%~99.9%, 54.5%~70.0% and 82.8%~99.9% respectively, and the $BOD_5/COD$ ratio in the waste water is increased to higher than 0.419.

Accordingly, the mass ratio of pyrophosphate and polyphosphate is arbitrary.

According to a 12th preferred embodiment of the present invention, the water treatment agent is similar to the water treatment agent of the above fifth preferred embodiment except that the chelating agent is phosphate, pyrophosphate and polyphosphate.

According to a large number of experiments on the waste water samples (pH≈7.5), after a 30 min sufficient interaction with the water treatment agent according to this 12th preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene and carbamazepine are reduced by 74.2%~90.0%, 81.6%~90.0%, 81.4%~90.0%, 81.7%~90.0%, 86.0%~97.8%, 74.5%~90.0%, 75.1%~90.0%, 75.2%~90.0%, 92.1%~99.9%, 92.3%~99.9%, 91.7%~99.9%, 92.4%~99.9%, 71.4%~80.0%, 74.1%~90.0%, 72.0%~90.0%, 93.0%~99.9%, 54.6%~70.0%, and 82.7%~99.9% respectively, and the $BOD_5/COD$ ratio in the waste water is increased to higher than 0.418.

It is worth mentioning that the mass ratio of phosphate, pyrophosphate and polyphosphate is arbitrary.

According to a 13th preferred embodiment of the present invention, the water treatment agent is similar to the water treatment agent of the above seventh preferred embodiment except that the micromolecule carboxylic acid is selected from the group consisting of oxalic acid, citric acid, tartaric acid, malonic acid, succinic acid, benzoic acid, salicylic acid, phthalic acid, sulfosalicylic acid, maleic acid, fumaric acid, gallic acid, tannic acid and the combination thereof.

According to a 14th preferred embodiment of the present invention, the water treatment agent is similar to the water treatment agent of the above fifth preferred embodiment except that the chelating agent is selected from the group consisting of oxalic acid, citric acid, tartaric acid, malonic acid, succinic acid, benzoic acid, salicylic acid, phthalic acid, sulfosalicylic acid, maleic acid, fumaric acid, gallic acid and tannic acid.

According to a large number of experiments on the waste water samples (pH≈8.0), after a 40 min sufficient interaction with the water treatment agent according to this 14th preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene and carbamazepine is reduced by greater than 70.0%, 80.0%~92%, 81.5%~92%, 80.4%~91.4%, 80.0%~95.0%, 72.5%~92%, 75.1%~90.5%, 75.0%~90.0%, 92.0%~99.9%, 92.2%~99.9%, 92.7%~99.9%, 92.3%~99.9%, 71.3%~80.0%, 74.6%~90.0%, 71.4%~90.0%, 93.1%~99.9%, 60.3%~70.0% and 82.4%~99.9% respectively, and the $BOD_5/COD$ ratio in the waste water is increased to higher than 0.420.

According to a 15th preferred embodiment of the present invention, the water treatment agent is similar to the water treatment agent of the above fifth preferred embodiment except that the chelating agent is citric acid, tartaric acid, phthalic acid, sulfosalicylic acid and tannic acid.

According to a large number of experiments on the waste water samples (pH≈8.5), after a 40 min sufficient interaction with the water treatment agent according to this 15th preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene and carbamazepine are reduced by 75%~90.0%, 80.4%~92%, 81.4%~92%, 80.2%~91.4%, 80.4%~95.0%, 72.3%~92%, 75.0%~90.5%, 75.7%~90.0%, 92.1%~99.9%, 92.0%~99.9%, 92.5%~99.9%, 92.3%~99.9%, 71.2%~80.0%, 74.5%~90.0%, 71.8%~90.0%, 93.4%~99.9%, 61.4%~70.0% and 82.5%~99.9% respectively, and the $BOD_5/COD$ ratio in the waste water is increased to higher than 0.420.

It is noteworthy that the mass ratio of citric acid, tartaric acid, phthalic acid, sulfosalicylic acid and tannic acid of the chelating agent is arbitrary.

According to a 16th preferred embodiment of the present invention, the water treatment agent is similar to the water treatment agent of the above fifth preferred embodiment except that the chelating agent is oxalic acid and citric acid.

According to a large number of experiments on the waste water samples (pH≈9), after a 40 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene and carbamazepine are reduced by 74%~92.4%, 80.3%~92%, 81.5%~92%, 80.1%~91.4%, 80.5%~95.0%, 72.2%~92%, 75.3%~90.5%, 75.6%~90.0%, 91.9%~99.9%, 92.1%~99.9%, 92.7%~99.9%, 92.3%~99.9%, 71.2%~80.0%, 74.4%~90.0%, 71.6%~90.0%, 93.4%~99.9%, 61.4%~70.0% and 82.3%~99.9% respectively, and the $BOD_5/COD$ ratio in the waste water is increased to higher than 0.418.

It is worth mentioning that the mass ratio of oxalic acid and citric acid of the chelating agent is arbitrary.

According to a 17th preferred embodiment of the present invention, the water treatment agent is similar to the water treatment agent of the above fifth preferred embodiment except that the chelating agent is oxalic acid, citric acid, tartaric acid, malonic acid, succinic acid, benzoic acid, salicylic acid, phthalic acid, sulfosalicylic acid, maleic acid, fumaric acid, gallic acid and tannic acid.

According to a large number of experiments on the waste water samples (pH≈5.5), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene and carbamazepine are reduced by 72.4%~92.3%, 81.2%~92.1%, 81.6%~92%, 80.2%~91.4%, 81.0%~95.0%, 72.7%~92%, 75.4%~90.4%, 76.0%~90.0%, 92.1%~99.9%, 92.0%~99.9%, 92.3%~99.9%, 92.2%~99.9%, 71.3%~80.0%, 74.5%~90.0%, 71.8%~90.0%, 93.3%~99.9%, 61.9%~70.0% and 82.4%~99.9% respectively, and $BOD_5/COD$ ratio in the waste water is increased to higher than 0.418.

Accordingly, the mass ratio of oxalic acid, citric acid, tartaric acid, malonic acid, succinic acid, benzoic acid, salicylic acid, phthalic acid, sulfosalicylic acid, maleic acid, fumaric acid, gallic acid and tannic acid of the chelating agent is arbitrary.

According to an 18th preferred embodiment of the present invention, the water treatment agent is similar to the water treatment agent of the above fifth preferred embodiment except that the chelating agent is succinic acid.

According to a large number of experiments on the waste water samples (pH≈6.5), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene and carbamazepine are reduced by 72.4%~92.3%, 81.0%~92.1%, 81.5%~92.2%, 80.4%~91.4%, 81.3%~95.0%, 72.4%~92%, 75.5%~90.3%, 76.0%~90.0%, 92.0%~99.9%, 92.4%~99.9%, 92.0%~99.9%, 92.1%~99.9%, 71.5%~80.0%, 75.0%~90.2%, 93.5%~99.9%, 63.4%~70.0% and 82.2%~99.9% respectively, and the $BOD_5/COD$ ratio in the waste water is increased to higher than 0.418.

According to a 19th preferred embodiment of the present invention, the water treatment agent is similar to the water treatment agent of the above fifth preferred embodiment except that the chelating agent is tartaric acid, succinic acid and salicylic acid.

According to a large number of experiments on the waste water samples (pH≈6.5), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene and carbamazepine are reduced by 75.0%~92.0%, 81.4%~92.5%, 81.6%~92.2%, 80.6%~91.4%, 81.4%~95.0%, 72.3%~92%, 75.4%~90.3%, 75.7%~90.0%, 92.5%~99.9%, 92.2%~99.9%, 92.1%~99.9%, 92.0%~99.9%, 71.6%~80.0%, 75.2%~90.2%, 72.5%~90.0%, 93.5%~99.9%, 64.4%~70.0% and 82.3%~99.9% respectively, and the $BOD_5/COD$ ratio in the waste water is increased to higher than 0.418.

It is noteworthy that the mass ratio of tartaric acid, succinic acid and salicylic acid of the chelating agent is arbitrary.

According to a 20th preferred embodiment of the present invention, the water treatment agent is similar to the water treatment agent of the above fifth preferred embodiment except that the chelating agent is citric acid, sulfosalicylic acid, maleic acid, fumaric acid and gallic acid.

According to a large number of experiments on the waste water samples (pH≈7.5), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene and carbamazepine are reduced by 75.3%~92.1%, 81.5%~92.5%, 81.7%~92.2%, 80.6%~91.2%, 81.4%~94.0%, 72.3%~92.1%, 75.6%~90.3%, 75.7%~92.0%, 92.1%~99.9%, 92.0%~99.9%, 92.0%~99.9%, 92.4%~99.9%, 73.0%~80.0%, 75.4%~90.2%, 72.4%~90.0%, 93.0%~99.9% and 64.5%~70.2% respectively, and the $BOD_5/COD$ ratio in the waste water is increased to higher than 0.418.

Need to mention that the mass ratio of citric acid, sulfosalicylic acid, maleic acid, fumaric acid and gallic acid of the chelating agent is arbitrary.

According to a 21st preferred embodiment of the present invention, the water treatment agent is similar to the water treatment agent of the above fifth preferred embodiment except that the chelating agent is oxalic acid, citric acid, malonic acid, succinic acid, phthalic acid, sulfosalicylic acid, maleic acid and gallic acid.

According to a large number of experiments on the waste water samples (pH≈8.0), after a 40 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene and carbamazepine are reduced by 77%~92.5%, 81.5%~92.0%, 81.6%~92.2%, 80.7%~91.2%, 81.6%~94.0%, 72.5%~92.1%, 75.6%~90.4%, 75.6%~92.6%, 93.0%~99.9%, 92.3%~99.9%, 92.2%~99.9%, 92.4%~99.9%, 73.3%~80.0%, 75.8%~90.2%, 71.9%~90.0%, 92.8%~99.9%, 64.5%~71.0% and 83.0%~99.9% respectively, and the $BOD_5/COD$ ratio in the waste water is increased to higher than 0.418.

It is noteworthy that the mass ratio of oxalic acid, citric acid, malonic acid, succinic acid, phthalic acid, sulfosalicylic acid, maleic acid and gallic acid of the chelating agent is arbitrary.

According to a 22nd preferred embodiment of the present invention, the water treatment agent is similar to the water treatment agent of the above seventh preferred embodiment except that the chelating agent is selected from the group consisting of ethylenediaminetetraacetic acid (EDTA), cyclohexane diamine tetraacetic acid (DCTA), nitrilotriacetic acid (NTA), ethylene glycol tetraacetic acid (EGTA), ethylenediaminetetraacetic acid (EDTP), triethylenetetramine (TET), ethylene diamine disuccinic acid (EDDS), diethylene triamine pentaacetic acid (DTPA), nitrilotrimethyl phosphonic acid (NTMP), ethylene diamine tetra methylene phosphonic acid (EDTMP), and the combination thereof.

According to a 23rd preferred embodiment of the present invention, the water treatment agent is similar to the water treatment agent of the above fifth preferred embodiment except that the chelating agent is ethylenediaminetetraacetic acid, cyclohexane diamine tetraacetic acid, nitrilotriacetic acid, ethylene glycol tetraacetic acid, ethylenediaminetetraacetic acid, triethylenetetramine, ethylene diamine disuccinic acid, diethylene triamine pentaacetic acid, nitrilotrimethyl phosphonic acid, or ethylene diamine tetra methylene phosphonic acid.

According to a large number of experiments on the waste water samples (pH=6.0~8.0), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by at least 70.0%, 80.0%, 81.5%, 80.0%, 80.0%, 75%, 70.0%, 75%, 92%, 90.0%, 90.0%, 90.0%, 70.0%, 75%, 70.0%, 90.0%, 60.0% and 80.0% respectively, and the $BOD_5$/COD ratio in the waste water is increased to higher than 0.418.

According to a 24th preferred embodiment of the present invention, the water treatment agent is similar to the water treatment agent of the above fifth preferred embodiment except that the chelating agent is cyclohexane diamine tetraacetic acid and ethylenediaminetetraacetic acid.

According to a large number of experiments on the waste water samples (pH≈8.0), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 77.5%~92.4%, 81.6%~92.0%, 82.0%~93.0%, 80.7%~91.9%, 81.8%~94.0%, 79.5%~92.4%, 75.6%~90.4%, 76.3%~92.8%, 93.0%~99.9%, 92.4%~99.9%, 92.3%~99.9%, 92.5%~99.9%, 73.3%~80.0%, 78.0%~90.5%, 72.8%~91.7%, 92.8%~99.9%, 65.6%~73.0% and 82.0%~99.9% respectively, and the $BOD_5$/COD ratio in the waste water is increased to higher than 0.418.

It is worthy to mention that the mass ratio of cyclohexane diamine tetraacetic acid and ethylenediaminetetraacetic acid of the chelating agent is arbitrary.

According to a 25th preferred embodiment of the present invention, the water treatment agent is similar to the water treatment agent of the above fifth preferred embodiment except that the chelating agent is ethylenediaminetetraacetic acid, ethylene diamine disuccinic acid and ethylene diamine tetra methylene phosphonic acid.

According to a large number of experiments on the waste water samples (pH≈7.0), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 77.4%~92.4%, 81.6%~92.1%, 82.3%~93.3%, 80.6%~91.9%, 81.9%~94.0%, 78.6%~92.3%, 75.9%~90.4%, 76.4%~92.8%, 93.1%~99.9%, 92.3%~99.9%, 92.5%~99.9%, 92.7%~99.9%, 73.4%~82.0%~, 78.6%~90.5%, 72.9%~91.7%, 92.7%~99.9%, 65.6%~74.5% and 82.2%~99.9% respectively, and the $BOD_5$/COD ratio in the waste water is increased to higher than 0.418.

It is worth mentioning that the mass ratio of ethylenediaminetetraacetic acid, ethylene diamine disuccinic acid and ethylene diamine tetra methylene phosphonic acid of chelating agent is arbitrary.

According to a 26th preferred embodiment of the present invention, the water treatment agent is similar to the water treatment agent of the above fifth preferred embodiment except that the chelating agent is cyclohexane diamine tetraacetic acid, nitrilotriacetic acid, ethylenediaminetetraacetic acid, ethylene diamine disuccinic acid, nitrilotrimethyl phosphonic acid, and ethylene diamine tetra methylene phosphonic acid.

According to a large number of experiments on the waste water samples (pH≈7.0), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 77.6%~92.4%, 81.6%~92.1%, 82.2%~93.0%, 80.8%~91.9%, 82.3%~94.0%, 78.7%~92.5%, 75.6%~90.4%, 76.7%~92.8%, 93.3%~99.9%, 92.4%~99.9%, 92.2%~99.9%, 92.6%~99.9%, 73.5%~82.0%, 78.7%~90.5%, 72.7%~91.7%, 92.9%~99.9%, 65.7%~74.5% and 82.6%~99.9% respectively, and the $BOD_5$/COD ratio in the waste water is increased to higher than 0.418.

It is worth mentioning that the mass ratio of cyclohexane diamine tetraacetic acid, Nitrilotriacetic acid, ethylenediaminetetraacetic acid, ethylene diamine disuccinic acid, nitrilotrimethyl phosphonic acid, and ethylene diamine tetra methylene phosphonic acid is arbitrary.

According to a 27th preferred embodiment of the present invention, the water treatment agent is similar to the water treatment agent of the above fifth preferred embodiment except that the chelating agent is ethylenediaminetetraacetic acid, cyclohexane diamine tetraacetic acid, nitrilotriacetic acid, ethylene glycol tetraacetic acid, ethylenediaminetetraacetic acid, triethylenetetramine, ethylene diamine disuccinic acid, diethylene triamine pentaacetic acid, nitrilotrimethyl phosphonic acid, or ethylene diamine tetra methylene phosphonic acid.

According to a large number of experiments on the waste water samples (pH≈7.5), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 77.6%~92.2%, 81.7%~92.0%, 82.4%~93%, 80.7%~91.9%, 81.8%~93.8%, 78.7%~92.4%, 76.4%~90.4%, 76.7%~92.8%, 93.0%~99.9%, 92.7%~99.9%, 92.8%~99.9%, 92.7%~99.9%, 73.4%~82.0%, 78.9%~90.5%, 73.4%~91.8%, 92.5%~99.9%, 65.9%~76.5% and 82.5%~99.9% respectively, and the $BOD_5$/COD ratio in the waste water is increased to higher than 0.418.

It is worth mentioning that the mass ratio of ethylenediaminetetraacetic acid, cyclohexane diamine tetraacetic acid, nitrilotriacetic acid, ethylene glycol tetraacetic acid, ethylenediaminetetraacetic acid, triethylenetetramine, ethylene diamine disuccinic acid, diethylene triamine pentaacetic acid, nitrilotrimethyl phosphonic acid, or ethylene diamine tetra methylene phosphonic acid is arbitrary.

According to a 28th preferred embodiment of the present invention, the water treatment agent is similar to the water treatment agent of the above fifth preferred embodiment except that the chelating agent is nitrilotriacetic acid.

According to a large number of experiments on the waste water samples (pH≈7.5), after a 35 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 77.0%~92.3%, 81.9%~92.4%, 82.4%~93.2%, 81.5%~91.8%, 81.6%~93.8%, 80.3%~92.0%, 75.4%~90.4%, 76.0%~92.5%, 93.1%~99.9%, 92.4%~99.9%, 92.3%~99.9%, 92.6%~99.9%, 73.4%~80.0%, 78.0%~90.0%, 72.7%~91.5%, 92.8%~99.9%, 65.6%~72.7% and 82.1%~99.9% respectively, and the $BOD_5$/COD ratio in the waste water is increased to higher than 0.418.

According to a 29th preferred embodiment of the present invention, the water treatment agent is similar to the water treatment agent of the above fifth preferred embodiment except that the chelating agent is cyclohexane diamine tetraacetic acid, ethylene glycol tetraacetic acid, ethylenediaminetetraacetic acid, diethylene triamine pentaacetic acid, and nitrilotrimethyl phosphonic acid.

According to a large number of experiments on the waste water samples (pH≈7.5), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 77.0%~90.5%, 81.7%~91.4%, 82.4%~93.1%, 81.6%~91.9%, 81.7%~93.8%, 80.4%~91.4%, 75.7%~91.6%, 76.0%~92.4%, 93.0%~99.9%, 92.3%~99.9%, 92.1%~99.9%, 92.5%~99.9%, 73.0%~80.2%, 78.1%~89.8%, 72.5%~91.4%, 92.7%~99.9%, 65.3%~72.7% and 82.0%~99.9% respectively, and the $BOD_5$/COD ratio in the waste water is increased to higher than 0.418.

Accordingly, the mass ratio of cyclohexane diamine tetraacetic acid, ethylene glycol tetraacetic acid, ethylenediaminetetraacetic acid, diethylene triamine pentaacetic acid, and nitrilotrimethyl phosphonic acid of the chelating agent is arbitrary.

According to a 30th preferred embodiment of the present invention, the water treatment agent is similar to the water treatment agent of the above seventh preferred embodiment except that the macromolecular carboxylic acid is humic acid, fulvic acid and/or alginic acid.

Humic acid, fulvic acid and alginic acid can also make contribution for accelerating the production of intermediate manganese.

According to a 31st preferred embodiment of the present invention, the water treatment agent is similar to the water treatment agent of the above fifth preferred embodiment except that the chelating agent is humic acid, fulvic acid or alginic acid.

According to a large number of experiments on the waste water samples (pH=6.0~8.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by at least 70.0%, 80.0%, 81.5%, 80.0%, 80.0%, 75%, 70.0%, 75%, 92%, 90.0%, 90.0%, 90.0%, 70.0%, 75%, 70.0%, 90.0%, 60.0% and 80.0% respectively, and the $BOD_5$/COD ratio in the waste water is increased to higher than 0.418.

According to a 32nd preferred embodiment of the present invention, the water treatment agent is similar to the water treatment agent of the above fifth preferred embodiment except that the chelating agent is humic acid and fulvic acid.

According to a large number of experiments on the waste water samples (pH=7.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 77.5%~92.3%, 81.7%~92.0%, 82.4%~93.0%, 80.8%~91.9%, 81.6%~94.0%, 80.0%~92.3%, 75.7%~90.2%, 76.3%~92.8%, 93.1%~99.9%, 92.3%~99.9%, 92.4%~99.9%, 92.3%~99.9%, 73.8%~80.0%, 78.7%~90.5%, 72.6%~91.7%, 92.5%~99.9%, 65.7%~73.0% and 82.5%~99.9% respectively, and the $BOD_5$/COD ratio in the waste water is increased to higher than 0.418.

It is noteworthy that the mass ratio of humic acid and fulvic acid of the chelating agent is arbitrary.

According to a 33rd preferred embodiment of the present invention, the water treatment agent is similar to the water treatment agent of the above fifth preferred embodiment except that the chelating agent is humic acid and alginic acid.

According to a large number of experiments on the waste water samples (pH=7.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.8%~92.0%, 81.5%~92.0%, 82.3%~93.2%, 80.8%~91.9%, 81.5%~94.3%, 80.4%~92.2%, 75.8%~90.2%, 76.5%~92.7%, 93.2%~99.9%, 92.2%~99.9%, 92.5%~99.9%, 92.3%~99.9%, 73.9%~80.0%, 78.6%~90.5%, 72.7%~91.7%, 92.5%~99.9%, 65.6%~74.1% and 82.7%~99.9% respectively, and the $BOD_5$/COD ratio in the waste water is increased to higher than 0.418.

It is worth mentioning that the mass ratio of humic acid and alginic acid of the chelating agent is arbitrary.

According to a 34th preferred embodiment of the present invention, the water treatment agent is similar to the water treatment agent of the above fifth preferred embodiment except that the chelating agent is fulvic acid and alginic acid.

According to a large number of experiments on the waste water samples (pH=8.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 77.4%~92.4%, 81.5%~91.8%, 82.5%~93.0%, 80.7%~91.5%, 81.7%~94.0%, 80.0%~92.0%, 75.8%~90.3%, 76.5%~90.8%, 93.0%~99.9%, 92.3%~99.9%, 92.5%~99.9%, 92.4%~99.9%, 73.9%~82.2%, 78.8%~91.2%, 72.7%~91.8%, 92.4%~99.9%, 65.6%~73.0% and 82.6%~99.9% respectively, and the $BOD_5$/COD ratio in the waste water is increased to higher than 0.418.

It is worth mentioning that the mass ratio of fulvic acid and alginic acid of the chelating agent is arbitrary.

According to a 35th preferred embodiment of the present invention, the water treatment agent is similar to the water treatment agent of the above fifth preferred embodiment except that the chelating agent is humic acid, fulvic acid and alginic acid.

According to a large number of experiments on the waste water samples (pH=6.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 77.6%~92.3%, 81.5%~92.2%, 82.5%~93.2%, 80.9%~91.7%, 81.4%~93.4%, 80.7%~92.0%, 75.7%~90.2%, 76.3%~92.8%, 93.4%~99.9%, 92.0%~99.9%, 92.2%~99.9%, 91.9%~99.9%, 73.7%~80.0%, 78.5%~90.5%, 72.6%~91.7%, 92.6%~99.9%, 65.6%~73.4% and 82.4%~99.9% respectively, and the $BOD_5$/COD ratio in the waste water is increased to higher than 0.418.

It is worth mentioning that the mass ratio of humic acid, fulvic acid and alginic acid of the chelating agent is arbitrary.

According to a 36th preferred embodiment of the present invention, the water treatment agent is similar to the water treatment agent of the above seven preferred embodiment except that the synthetic macromolecular chelating agent is hydrolyted poly maleic acid, acrylic acid, acrylic acid/acrylic ester, acrylic acid/2-methyl-2-acrylamido propyl sulfonic acid (AMPS), phosphino polycarboxylic acid (PCA), copolymer of phosphono and carboxylic acid (POCA), polyepoxysuccinic acid (PESA) or polyaspartic acid (PAST).

According to a large number of experiments on the waste water samples (pH=6.0~8.0), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by at least 75.0%, 82.0%, 81.5%, 80.0%, 85%, 75.0%, 75.0%, 75.0%, 91.0%, 90.0%, 90.0%, 90.0%, 73.0%, 75%, 72.0%, 90.0%, 65.0% and 82.0% respectively, and the $BOD_5$/COD ratio in the waste water is increased to higher than 0.418.

According to a 37th preferred embodiment of the present invention, the water treatment agent is similar to the water treatment agent of the above fifth preferred embodiment except that the chelating agent is phosphino polycarboxylic acid.

According to a 38th preferred embodiment of the present invention, the water treatment agent is similar to the water treatment agent of the above fifth preferred embodiment except that the chelating agent is polyepoxysuccinic acid.

According to a 39th preferred embodiment of the present invention, the water treatment agent is similar to the water treatment agent of the above fifth preferred embodiment except that the chelating agent is hydrolyted poly maleic acid.

According to a 40th preferred embodiment of the present invention, the water treatment agent is similar to the water treatment agent of the above fifth preferred embodiment except that the chelating agent is polyaspartic acid.

According to a 41st preferred embodiment of the present invention, the water treatment agent is similar to the water treatment agent of the above seven preferred embodiment except that the amino acid is glycin, glutamic acid, aspartic acid, alanine, phenylalanine, or tryptophan.

According to a large number of experiments on the waste water samples (pH=6.0~8.0), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by at least 72.0%, 83.0%, 82.0%, 80.0%, 80.0%, 75.0%, 75.0%, 75.0%, 92%, 90.0%, 90.0%, 90.0%, 70.0%, 75%, 70.0%, 90.0% 60.0% and 80.0% respectively, and the $BOD_5$/COD ratio in the waste water is increased to higher than 0.418.

According to a 42nd preferred embodiment of the present invention, the water treatment agent is similar to the water treatment agent of the above seven preferred embodiment except that the resin is anion ion exchange resin.

According to a large number of experiments on the waste water samples (pH=5.5~8.5), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by at least 75.0%, 82.0%, 80.0%, 80.5%, 80.0%, 70.0%, 75.0%, 75.0%, 90%, 92.0%, 91.0%, 90.0%, 73.0%, 75% 70.0%, 90.0%, 65.0% and 80.0% respectively, and the $BOD_5$/COD ratio in the waste water is increased to higher than 0.418.

According to a 43rd preferred embodiment of the present invention, the water treatment agent is consisted of potassium permanganate, chelating agent and inducer, wherein the mass ratio of potassium permanganate, chelating agent and inducer is 1:0.5~50:0.1~1.

The method employing the water treatment agent of this preferred embodiment for water treatment comprises the following steps: a) Adding water treatment agent of the present invention into the waste water, maintaining the initial concentration of potassium permanganate to 0.1~15 mg/L and the hydraulic retention time to 1~60 min; b) Coagulating and flocculating the resulting water of step a); c) Purifying the resulting water of step b) with a biological activated carbon adsorbing process and a subsequent filtrating process; d) Disinfecting the resulting water of step c) to obtain purified water; wherein the waste water of step a) is polluted water which has not undergone the coagulation and flocculation process or secondary water from the water treatment plant.

Accordingly, biological activated carbon is activate carbon with biological membranes, and step c) can cooperates with an aeration process; the adding amount of water treatment agent and the hydraulic retention time can be varied according to the actual situation.

The chelating agent of this preferred embodiment is selected from the group consisting of inorganic chelating agent, chelating agent, micromolecule carboxylic acid, amino acid, aminopolycarboxylate, macromolecular carboxylic acid, synthetic macromolecular chelating agent, chelating agent, algae, polyoxometalate (POM), activated carbon with carboxyl functional group on the surface thereof, activated carbon with hydroxyl group on the surface thereof, activated carbon with carbonyl functional group on the surface thereof, activated carbon with alcohol functional group on the surface thereof, activated carbon with pyrrolidinyl functional group on the surface thereof, activated carbon with furan functional group on the surface thereof, activated carbon with pyridyl functional group on the surface thereof and anion exchange resin.

Accordingly, the removal efficiency of the water treatment agent according to this preferred embodiment of the present invention maintains stable under an aqueous environment with pH value of 5~9 and temperature of 5~40° C.

According to a large number of experiments on the waste water samples, after a 20 min sufficient interaction (i.e. the hydraulic retention time is 20 min) with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 60.0%~90.0%, 80.0%~90.0%, 80.0%~90.0%, 80.0%~90.0%, 80.0%~90.0%, 70.0%~90.0%, 70.0%~90.0%, 70.0%~90.0%, 90.0%~99.9%, 90.0%~99.9%, 90.0%~99.9%, 90.0%~99.9%, 70.0%~80.0%, 70.0%~90.0%, 70.0%~90.0%, 90.0%~99.9%, 50.0%~70.0% and 80.0%~99.9%, and the $BOD_5$/COD ratio in the waste water is greatly increased ($BOD_5$ is Biochemical Oxygen Demand in five days, COD is Chemical Oxygen Demand).

According to a 44th preferred embodiment of the present invention, the water treatment agent is similar to the water treatment agent of the above 43rd preferred embodiment except that the mass ratio of potassium permanganate, chelating agent and inducer is 1:1~45:0.2~0.8.

According to a large number of experiments, after a 20 min sufficient interaction with the water treatment agent according to the this preferred embodiment of the present invention, poisonous and toxic refractory organic pollutants in the waste water is greatly decreased, and the $BOD_5$/COD ratio is higher than 0.422.

According to a 45th preferred embodiment of the present invention, the water treatment agent is similar to the water treatment agent of the above 43rd preferred embodiment except that the mass ratio of potassium permanganate, chelating agent and inducer is 1:5~40:0.3~0.7.

According to a large number of experiments, after a 20 min sufficient interaction with the water treatment agent according to the this preferred embodiment of the present invention, poisonous and toxic refractory organic pollutants in the waste water is greatly decreased, and the $BOD_5$/COD ratio is higher than 0.43.

According to a 46th preferred embodiment of the present invention, the water treatment agent is similar to the water treatment agent of the above 43rd preferred embodiment except that the mass ratio of potassium permanganate, chelating agent and inducer is 1:15~30:0.4~0.6.

According to a large number of experiments, after a 20 min sufficient interaction with the water treatment agent according to the this preferred embodiment of the present invention, poisonous and toxic refractory organic pollutants in the waste water is greatly decreased, and the $BOD_5$/COD ratio is higher than 0.43.

According to a 47th preferred embodiment of the present invention, the water treatment agent is similar to the water treatment agent of the above 43rd preferred embodiment except that the mass ratio of potassium permanganate, chelating agent and inducer is 1:20~25:0.5.

According to a large number of experiments, after a 20 min sufficient interaction with the water treatment agent according to the this preferred embodiment of the present invention, poisonous and toxic refractory organic pollutants in the waste water is greatly decreased, and the $BOD_5$/COD ratio is higher than 0.455.

According to a 48th preferred embodiment of the present invention, the water treatment agent is similar to the water treatment agent of the above 43rd preferred embodiment except that the mass ratio of potassium permanganate, chelating agent and inducer is 1:10~20:0.4~0.6.

According to a large number of experiments, after a 20 min sufficient interaction with the water treatment agent according to the this preferred embodiment of the present invention, poisonous and toxic refractory organic pollutants in the waste water is greatly decreased, and the $BOD_5$/COD ratio is higher than 0.468.

According to a 49th preferred embodiment of the present invention, the water treatment agent is similar to the water treatment agent of the above 43rd preferred embodiment except that the mass ratio of potassium permanganate, chelating agent and inducer is 1:2:0.1.

According to a large number of experiments (the initial concentration of potassium permanganate in the waste water sample is 8 mg/L), after a 20 min sufficient interaction with the water treatment agent according to the this preferred embodiment of the present invention, poisonous and toxic refractory organic pollutants in the waste water is greatly decreased, and the $BOD_5$/COD ratio is higher than 0.430.

According to a 50th preferred embodiment of the present invention, the water treatment agent is similar to the water treatment agent of the above 43rd, 44th, 45th, 46th, 47th, 48th and 49th preferred embodiment except that the inducer is selected from the group consisting of arsenite, sulfite, sulfide, nitrite, styrene, ethylene, propylene, butylene, trichloroethene, dichloroethene, tetrachloroethene, o-hydroquinone, p-hydroquinone, m-hydroquinonee, 1-naphthol, 2-naphthol, m-trihydroxybenzene, m-trihydroxybenzene, and trihydroxybenzene.

In addition, the inducer of this preferred embodiment can further comprise arsenite, sulfite and hydrogen sulfide.

According to a 51st preferred embodiment of the present invention, the water treatment agent is similar to the water treatment agent of the above 50th preferred embodiment except that the arsenite is selected from the group consisting of ferric arsenite, potassium arsenite and sodium arsenite.

According to a 52nd preferred embodiment of the present invention, the water treatment agent is similar to the water treatment agent of the above 50th preferred embodiment except that the sulfite is selected from the group consisting of ferric sulfite, ammonium sulfite, potassium sulfite and sodium sulfite.

According to a 53rd preferred embodiment of the present invention, the water treatment agent is similar to the water treatment agent of the above 50th preferred embodiment except that the sulfide is selected from the group consisting of ammonium sulfide, sodium sulfide and potassium sulfide.

According to a 54th preferred embodiment of the present invention, the water treatment agent is similar to the water treatment agent of the above 50th preferred embodiment except that the nitrite is selected from the group consisting of barium nitrite, calcium nitrite, sodium nitrite, sodium cobaltinitrite, potassium nitrite and sodium nitrite.

According to a 55th preferred embodiment of the present invention, the water treatment agent is similar to the water treatment agent of the above 49th preferred embodiment except that the chelating agent is pyrophosphate and the inducer is o-hydroquinone.

2,4-dichlorophenol is a common and typical poisonous and toxic refractory organic pollutant. In this embodiment, adding appropriate amount of 2,4-dichlorophenol into water so as to prepare a waste water sample with 1.0 mg/L 2,4-dichlorophenol (pH value of the waste water sample is about 6.0).

The experiment is carried out in the following manner so as to research the efficiency of waste water treatment agent of the present invention in contrast to the conventional potassium permanganate.

The first group: adding the water treatment agent according to this preferred embodiment of the present invention into the waste water sample, adjusting the initial concentration of the potassium permanganate to 10 mg/l and controlling the hydraulic retention time to 30 min.

The second group: adding potassium permanganate into the waste water sample, adjusting the initial concentration of the potassium permanganate to 10 mg/l and controlling the hydraulic retention time to 90 min.

The third group: adding potassium permanganate and pyrophosphate into the waste water sample, wherein the mass ratio of potassium permanganate and pyrophosphate is 1:2, adjusting the initial concentration of the potassium permanganate to 10 mg/l and controlling the hydraulic retention time to 40 min.

Figure 3:
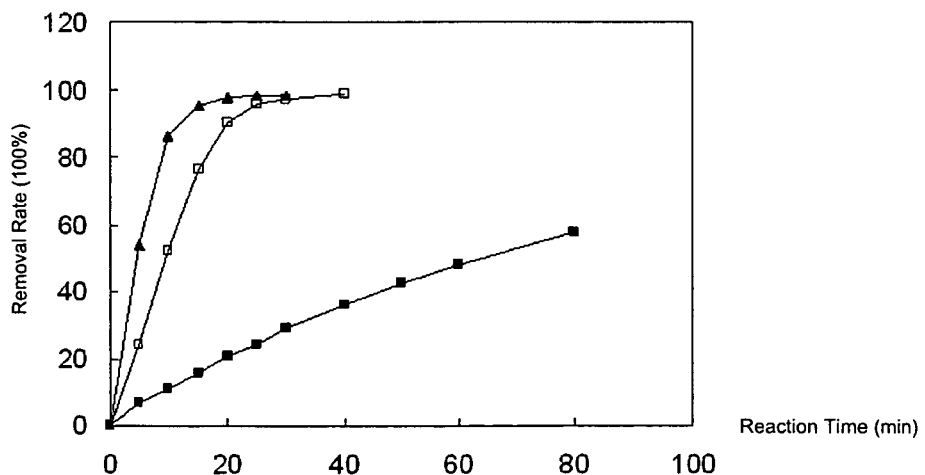
FIG. 3 is a schematic view according to the 55th preferred embodiment of the present invention, illustrating the variation of 2,4-Dichlorophenol removal rate of a waste water sample corresponding to the reaction time.

FIG. 3 is a schematic view according to this preferred embodiment of the present invention, illustrating the variation of 2,4-dichlorophenol removal rate of the waste water sample corresponding to the reaction time, wherein curves "▲", "■" and "□" represents the first, second and the second group respectively.

Referring to FIG. 3 of the drawing, 2,4-dichlorophenol removal rate after hydraulic retention time of 30 min for the second group is only 30.0%, and the figure just amounts to about 60.0% after hydraulic retention time of 80 min; accordingly, 2,4-dichlorophenol removal rate after hydraulic retention time of 30 min for the third group is nearly 99.9%; 2,4-dichlorophenol removal rate after hydraulic retention time of 10 min for the first group is higher than 90.0% and the figure amounts to nearly 99.9% after hydraulic retention time of 20 min. It can be concluded that the water treatment agent of the present invention not only accelerates the production of high active intermediate manganese, but also increases the producing speed and utilization rate of intermediate manganese so that the degradability of organic pollutants is enhanced.

According to a 56th preferred embodiment of the present invention, the water treatment agent is similar to the water treatment agent of the above 5th preferred embodiment except that the chelating agent is polyoxometalate.

According to a large number of experiments on the waste water samples (pH≈6.5), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by at least 70.0%, 80.0%, 81.5%, 80.0%, 80.0%, 75%, 70.0%, 75%, 92%, 90.0%, 90.0%, 90.0%, 70.0%, 75%, 70.0%, 90.0%, 60.0% and 80.0% respectively, and the $BOD_5/COD$ ratio in the waste water is increased to higher than 0.418.

According to a 57th preferred embodiment of the present invention, the water treatment agent is similar to the water treatment agent of the above 49th preferred embodiment except that the chelating agent is phosphate and pyrophosphate whilst the inducer is arsenite.

According to a large number of experiments on the waste water samples (pH∞6.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 77.5%~93.0%, 81.4%~93.0%, 82.4%~94.0%, 81.4%~92.5%, 81.4%~94.4%, 80.4%~93.6%, 75.4%~91.6%, 76.7%~93.6%, 92.1%~99.9%, 91.8%~99.9%, 92.3%~99.9%, 92.1%~99.9%, 73.9%~82.0%, 78.6%~91.5%, 72.9%~92.7%, 92.4%~99.9%, 65.5%~75.9% and 82.2%~99.9% respectively, and the $BOD_5/COD$ ratio in the waste water is increased to higher than 0.430.

It is noteworthy that the mass ratio of phosphate and pyrophosphate of the chelating agent is arbitrary.

According to a 58th preferred embodiment of the present invention, the water treatment agent is similar to the water treatment agent of the above 49th preferred embodiment except that the chelating agent is pyrophosphate whilst the inducer is ferric sulfite.

According to a large number of experiments on the waste water samples (pH≈7.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.5%~91.8%, 81.9%~92.5%, 82.5%~92.8%, 81.5%~91.6%, 81.4%~93.4%, 80.4%~92.4%, 76.4%~90.6%, 76.8%~92.6%, 92.0%~99.9%, 91.7%~99.9%, 92.6%~99.9%, 92.3%~99.9%, 75.4%~80.0%, 78.9%~90.5%, 72.5%~91.7%, 92.4%~99.9%, 65.7%~73.7% and 82.5%~99.9% respectively, and the $BOD_5/COD$ ratio in the waste water is increased to higher than 0.430.

According to a 59th preferred embodiment of the present invention, the water treatment agent is similar to the water treatment agent of the above 49th preferred embodiment except that the chelating agent is phosphate, pyrophosphate and polyphosphate whilst the inducer is barium nitrite.

According to a large number of experiments on the waste water samples (pH≈7.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.4%~91.8%, 81.7%~92.5%, 82.4%~92.8%, 81.3%~91.6%, 81.3%~93.4%, 80.6%~92.6%, 76.6%~90.6%, 76.9%~92.6%, 92.0%~99.9%, 91.8%~99.9%, 92.4%~99.9%, 92.3%~99.9%, 75.4%~80.0%, 78.7%~90.5%, 72.6%~91.7%, 92.4%~99.9%, 65.6%~73.7% and 82.5%~99.9% respectively, and the BOD$_5$/COD ratio in the waste water is increased to higher than 0.430.

It is noteworthy that the mass ratio of phosphate, pyrophosphate and polyphosphate of the chelating agent is arbitrary.

According to a 60th preferred embodiment of the present invention, the water treatment agent is similar to the water treatment agent of the above 49th preferred embodiment except that the chelating agent is phosphate and the inducer is o-hydroquinone.

According to a large number of experiments on the waste water samples (pH≈7.0), after a 18 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 80.9%~92.4%, 82.4%~95.3%, 83.4%~94.0%, 82.4%~92.5%, 81.3%~94.6%, 80.3%~93.7%, 75.4%~91.8%, 76.6%~93.7%, 92.3%~99.9%, 91.9%~99.9%, 92.4%~99.9%, 92.5%~99.9%, 73.9%~82.0%, 78.6%~91.7%, 72.5%~92.7%, 92.4%~99.9%, 67.5%~76.9% and 82.6%~99.9% respectively, and the BOD$_5$/COD ratio in the waste water is increased to higher than 0.430.

According to a 61st preferred embodiment of the present invention, the water treatment agent is similar to the water treatment agent of the above 49th preferred embodiment except that the chelating agent is pyrophosphate and polyphosphate whilst the inducer is trichloroethene.

According to a large number of experiments on the waste water samples (pH≈7.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 77.1%~93.1%, 81.0%~92.8%, 82.1%~94.0%, 81.3%~92.5%, 80.9%~94.5%, 80.1%~93.6%, 75.4%~91.4%, 76.7%~93.6%, 91.9%~99.9%, 91.3%~99.9%, 92.3%~99.9%, 92.1%~99.9%, 73.7%~82.0%, 78.6%~91.5%, 72.9%~92.7%, 92.4%~99.9%, 65.4%~75.9% and 82.5%~99.9% respectively, and the BOD$_5$/COD ratio in the waste water is increased to higher than 0.430.

It is noteworthy that the mass ratio of pyrophosphate and polyphosphate of the chelating agent is arbitrary.

According to a 62nd preferred embodiment of the present invention, the water treatment agent is similar to the water treatment agent of the above 49th preferred embodiment except that the chelating agent is oxalic acid, malonic acid, succinic acid and benzoic acid whilst the inducer is hydrogen sulfide.

According to a large number of experiments on the waste water samples (pH≈7.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.7%~91.7%, 81.3%~92.3%, 82.3%~92.8%, 81.4%~91.7%, 81.2%~93.4%, 80.6%~92.6%, 76.9%~90.6%, 77.9%~92.8%, 92.0%~99.9%, 91.8%~99.9%, 92.8%~99.9%, 92.1%~99.9%, 75.4%~81.2%, 78.0%~90.5%, 72.8%~91.7%, 92.7%~99.9%, 65.2%~73.3% and 82.6%~99.9% respectively, and the BOD$_5$/COD ratio in the waste water is increased to higher than 0.430.

It is noteworthy that the mass ratio of oxalic acid, malonic acid, succinic acid and benzoic acid of the chelating agent is arbitrary.

According to a 63rd preferred embodiment of the present invention, the water treatment agent is similar to the water treatment agent of the above 49th preferred embodiment except that the chelating agent is tartaric acid and the inducer is potassium arsenite.

According to a large number of experiments on the waste water samples (pH≈7.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 77.5%~93.0%, 81.4%~92.0%, 82.5%~94.0%, 81.3%~92.5%, 81.4%~94.4%, 80.4%~93.6%, 75.4%~90.6%, 76.7%~93.6%, 92.1%~99.9%, 91.7%~99.9%, 92.3%~99.9%, 92.3%~99.9%, 73.8%~82.0%, 78.6%~91.5%, 72.9%~92.7%, 92.4%~99.9%, 65.6%~75.9% and 82.2%~99.9% respectively, and the BOD$_5$/COD ratio in the waste water is increased to higher than 0.430.

According to a 64th preferred embodiment of the present invention, the water treatment agent is similar to the water treatment agent of the above 49th preferred embodiment except that the chelating agent is sulfosalicylic acid, maleic acid and fumaric acid whilst the inducer is sodium sulfite.

According to a large number of experiments on the waste water samples (pH≈7.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.2%~92.4%, 81.7%~92.6%, 82.3%~94.2%, 81.5%~92.6%, 80.9%~94.6%, 80.1%~93.3%, 75.7%~91.3%, 76.9%~93.6%, 91.5%~99.9%, 91.9%~99.9%, 92.3%~99.9%, 92.6%~99.9%, 73.8%~82.0%, 78.5%~91.5%, 72.6%~92.9%, 92.4%~99.9%, 65.8%~75.7% and 82.3%~99.9% respectively, and the BOD$_5$/COD ratio in the waste water is increased to higher than 0.430.

It is worth mentioning that the mass ratio of sulfosalicylic acid, maleic acid and fumaric acid of the chelating agent is arbitrary.

According to a 65th preferred embodiment of the present invention, the water treatment agent is similar to the water treatment agent of the above 49th preferred embodiment except that the chelating agent is citric acid, succinic acid and salicylic acid whilst the inducer is calcium nitrite.

According to a large number of experiments on the waste water samples (pH≈7.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.4%~92.8%, 81.3%~92.7%, 82.3%~94.3%, 81.2%~92.4%, 80.7%~94.5%, 80.4%~93.6%, 75.6%~91.4%, 76.8%~93.6%, 91.7%~99.9%, 91.6%~99.9%, 92.4%~99.9%, 92.3%~99.9%, 73.7%~81.8%, 78.6%~91.5%, 72.8%~92.6%, 92.4%~99.9%, 65.7%~75.8% and 82.6%~99.9% respectively, and the $BOD_5/COD$ ratio in the waste water is increased to higher than 0.430.

It is worth mentioning that the mass ratio of citric acid, succinic acid and salicylic acid of the chelating agent is arbitrary.

According to a 66th preferred embodiment of the present invention, the water treatment agent is similar to the water treatment agent of the above 49th preferred embodiment except that the chelating agent is gallic acid and salicylic acid, wherein the inducer is butylene.

According to a large number of experiments on the waste water samples (pH≈7.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 77.1%~93.2%, 81.0%~92.7%, 82.1%~94.1%, 81.2%~92.4%, 80.6%~94.6%, 80.1%~93.5%, 75.4%~91.3%, 76.8%~93.5%, 91.9%~99.9%, 91.3%~99.9%, 92.4%~99.9%, 92.3%~99.9%, 73.9%~82.0%, 78.6%~91.5%, 72.9%~92.7%, 92.3%~99.9%, 65.6%~75.8% and 82.4%~99.9% respectively, and the $BOD_5/COD$ ratio in the waste water is increased to higher than 0.430.

It is worth mentioning that the mass ratio of gallic acid and salicylic acid of the chelating agent is arbitrary.

According to a 67th preferred embodiment of the present invention, the water treatment agent is similar to the water treatment agent of the above 49th preferred embodiment except that the chelating agent is citric acid, tartaric acid, salicylic acid, gallic acid and tannic acid whilst the inducer is p-hydroquinone.

According to a large number of experiments on the waste water samples (pH≈8.0), after a 18 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 81.4%~92.3%, 82.3%~95.6%, 83.5%~94.2%, 82.3%~92.4%, 81.5%~94.7%, 80.6%~93.8%, 75.2%~92.0%, 76.7%~93.9%, 92.3%~99.9%, 91.8%~99.9%, 92.6%~99.9%, 92.4%~99.9%, 74.0%~82.3%, 78.9%~91.7%, 72.6%~92.8%, 92.7%~99.9%, 67.6%~78.9% and 82.9%~99.9% respectively, and the $BOD_5/COD$ ratio in the waste water is increased to higher than 0.430.

It is worth mentioning that the mass ratio of citric acid, tartaric acid, salicylic acid, gallic acid and tannic acid of the chelating agent is arbitrary.

According to a 68th preferred embodiment of the present invention, the water treatment agent is similar to the water treatment agent of the above 49th preferred embodiment except that the chelating agent is ethylenediaminetetraacetic acid, cyclohexane diamine tetraacetic acid, nitrilotriacetic acid, ethylene glycol tetraacetic acid, and ethylenediaminetetraacetic acid whilst the inducer is sulfite.

According to a large number of experiments on the waste water samples (pH≈7.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.5%~92.7%, 81.2%~92.6%, 82.2%~94.6%, 81.2%~92.5%, 80.7%~94.5%, 80.4%~93.6%, 76.6%~91.4%, 76.9%~93.5%, 91.2%~99.9%, 91.1%~99.9%, 92.8%~99.9%, 92.3%~99.9%, 73.7%~81.8%, 78.1%~91.5%, 72.5%~92.5%, 92.8%~99.9%, 65.8%~75.8% and 82.7%~99.9% respectively, and the $BOD_5/COD$ ratio in the waste water is increased to higher than 0.430.

It is worth mentioning that the mass ratio of ethylenediaminetetraacetic acid, cyclohexane diamine tetraacetic acid, nitrilotriacetic acid, ethylene glycol tetraacetic acid, and ethylenediaminetetraacetic acid of the chelating agent is arbitrary.

According to a 69th preferred embodiment of the present invention, the water treatment agent is similar to the water treatment agent of the above 49th preferred embodiment except that the chelating agent is ethylene diamine disuccinic acid and diethylene triamine pentaacetic acid whilst the inducer is potassium arsenite.

According to a large number of experiments on the waste water samples (pH≈8.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 77.5%~93.2%, 81.2%~93.3%, 82.5%~94.1%, 81.3%~92.6%, 81.4%~94.9%, 82.4%~93.6%, 75.5%~91.6%, 76.7%~94.1%, 92.1%~99.9%, 91.8%~99.9%, 92.3%~99.9%, 92.3%~99.9%, 73.5%~82.0%, 78.6%~91.5%, 72.9%~92.7%, 92.7%~99.9%, 65.6%~75.8% and 82.4%~99.9% respectively, and the $BOD_5/COD$ ratio in the waste water is increased to higher than 0.430.

It is worth mentioning that the mass ratio of ethylene diamine disuccinic acid and diethylene triamine pentaacetic acid of the chelating agent is arbitrary.

According to a 70th preferred embodiment of the present invention, the water treatment agent is similar to the water treatment agent of the above 49th preferred embodiment except that the chelating agent is nitrilotrimethyl phosphonic acid, and inducer is sodium sulfite.

According to a large number of experiments on the waste water samples (pH≈7.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.5%~91.7%, 81.7%~92.5%, 82.4%~92.8%, 81.3%~91.6%, 81.3%~93.4%, 82.6%~92.6%, 76.6%~91.6%, 76.9%~92.6%, 92.0%~99.9%, 91.8%~99.9%, 92.3%~99.9%, 92.3%~99.9%, 75.4%~80.0%, 78.7%~90.5%, 72.6%~91.7%, 92.4%~99.9%, 65.6%~73.7% and 82.5%~99.9% respectively, and the $BOD_5/COD$ ratio in the waste water is increased to higher than 0.430.

According to a 71st preferred embodiment of the present invention, the water treatment agent is similar to the water treatment agent of the above 49th preferred embodiment except that the chelating agent is nitrilotriacetic acid, ethylene glycol tetraacetic acid, ethylenediaminetetraacetic acid, triethylenetetramine, ethylene diamine disuccinic acid, diethylene triamine pentaacetic acid, nitrilotrimethyl phosphonic acid and ethylene diamine tetra methylene phosphonic acid whilst the inducer is sodium cobaltinitrite.

According to a large number of experiments on the waste water samples (pH≈6.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.7%~91.4%, 81.7%~92.4%, 82.2%~92.7%, 81.3%~91.6%, 81.6%~93.4%, 82.7%~91.6%, 76.6%~91.6%, 76.9%~92.6%, 92.0%~99.9%, 91.8%~99.9%, 92.6%~99.9%, 92.3%~99.9%, 75.3%~80.0%, 78.2%~90.5%, 72.1%~92.6%, 92.4%~99.9%, 65.7%~73.7% and 82.4%~99.9% respectively, and the $BOD_5/COD$ ratio in the waste water is increased to higher than 0.430.

It is worth mentioning that the mass ratio of nitrilotriacetic acid, ethylene glycol tetraacetic acid, ethylenediaminetetraacetic acid, triethylenetetramine, ethylene diamine disuccinic acid, diethylene triamine pentaacetic acid, nitrilotrimethyl phosphonic acid, and ethylene diamine tetra methylene phosphonic acid of the chelating agent is arbitrary.

According to a 72nd preferred embodiment of the present invention, the water treatment agent is similar to the water treatment agent of the above 49th preferred embodiment except that the chelating agent is nitrilotriacetic acid, ethylene glycol tetraacetic acid, ethylenediaminetetraacetic acid, triethylenetetramine and ethylene diamine disuccinic acid whilst the inducer is ethylene.

According to a large number of experiments on the waste water samples (pH≈7.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.9%~93.4%, 81.3%~92.7%, 82.1%~94.2%, 81.3%~92.5%, 80.7%~94.5%, 80.1%~93.5%, 75.4%~91.5%, 76.5%~93.6%, 91.9%~99.9%, 91.3%~99.9%, 92.3%~99.9%, 92.1%~99.9%, 73.5%~82.0%, 78.6%~91.5%, 72.9%~92.7%, 92.4%~99.9%, 65.4%~75.9% and 82.5%~99.9% respectively, and the $BOD_5/COD$ ratio in the waste water is increased to higher than 0.430.

It is worth mentioning that the mass ratio of nitrilotriacetic acid, ethylene glycol tetraacetic acid, ethylenediaminetetraacetic acid, triethylenetetramine, and ethylene diamine disuccinic acid of the chelating agent is arbitrary.

According to a 73rd preferred embodiment of the present invention, the water treatment agent is similar to the water treatment agent of the above 49th preferred embodiment except that the chelating agent is triethylenetetramine, ethylene diamine disuccinic acid, diethylene triamine pentaacetic acid and nitrilotrimethyl phosphonic acid whilst the inducer is o-hydroquinone.

According to a large number of experiments on the waste water samples (pH≈7.5), after a 18 mM sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 80.5%~92.0%, 82.1%~95.2%, 83.5%~94.1%, 82.2%~92.6%, 81.4%~94.5%, 80.3%~93.7%, 75.4%~91.8%, 76.2%~93.9%, 92.3%~99.9%, 91.9%~99.9%, 92.6%~99.9%, 92.5%~99.9%, 73.9%~83.0%, 78.6%~91.7%, 72.5%~92.7%, 92.7%~99.9%, 67.8%~76.8% and 82.6%~99.9% respectively, and the $BOD_5/COD$ ratio in the waste water is increased to higher than 0.430.

It is worth mentioning that the mass ratio of triethylenetetramine, ethylene diamine disuccinic acid, diethylene triamine pentaacetic acid and nitrilotrimethyl phosphonic acid of the chelating agent is arbitrary.

According to a 74th preferred embodiment of the present invention, the water treatment agent is similar to the water treatment agent of the above 49th preferred embodiment except that the chelating agent is humic acid, fulvic acid and alginic acid whilst the inducer is nitrous acid.

According to a large number of experiments on the waste water samples (pH≈8.5), after a 18 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 75.1%~91.0%, 81.3%~92.1%, 82.0%~92.3%, 81.0%~91.4%, 81.3%~93.4%, 82.6%~92.6%, 75.9%~91.1%, 76.5%~92.2%, 92.0%~99.9%, 91.8%~99.9%, 92.1%~99.9%, 92.0%~99.9%, 74.7%~80.0%, 78.4%~90.4%, 72.3%~91.7%, 92.4%~99.9%, 65.4%~73.5% and 82.1%~99.9% respectively, and the $BOD_5/COD$ ratio in the waste water is increased to higher than 0.430.

It is noteworthy that the mass ratio of humic acid, fulvic acid and alginic acid of the chelating agent is arbitrary.

According to a 75th preferred embodiment of the present invention, the water treatment agent is similar to the water treatment agent of the above 49th preferred embodiment except that the chelating agent is humic acid and alginic acid whilst the inducer is potassium arsenite.

According to a large number of experiments on the waste water samples (pH≈5.5), after a 18 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 75.3%~91.2%, 81.4%~92.3%, 82.1%~92.4%, 81.5%~91.3%, 81.4%~93.6%, 82.7%~92.6%, 75.9%~91.1%, 76.5%~92.2%, 92.3%~99.9%, 91.6%~99.9%, 92.3%~99.9%, 92.4%~99.9%, 74.5%~80.0%, 78.9%~91.4%, 72.6%~91.5%, 92.4%~99.9%, 65.6%~73.5% and 82.3%~99.9% respectively, and the $BOD_5$/COD ratio in the waste water is increased to higher than 0.430.

It is noteworthy that the mass ratio of humic acid and alginic acid of the chelating agent is arbitrary.

According to a 76th preferred embodiment of the present invention, the water treatment agent is similar to the water treatment agent of the above 49th preferred embodiment except that the chelating agent is fulvic acid and alginic acid whilst the inducer is ammonium sulfide.

According to a large number of experiments on the waste water samples (pH≈6.0), after a 18 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 75.6%~91.1%, 81.6%~92.0%, 82.6%~92.0%, 81.3%~91.6%, 81.7%~93.3%, 82.7%~92.5%, 75.9%~91.3%, 76.6%~92.5%, 92.3%~99.9%, 91.7%~99.9%, 92.3%~99.9%, 92.4%~99.9%, 74.8%~80.4%, 78.9%~91.4%, 72.9%~91.5%, 92.7%~99.9%, 65.6%~73.5% and 82.1%~99.9% respectively, and the $BOD_5$/COD ratio in the waste water is increased to higher than 0.430.

It is noteworthy that the mass ratio of fulvic acid and alginic acid of the chelating agent is arbitrary.

According to a 77th preferred embodiment of the present invention, the water treatment agent is similar to the water treatment agent of the above 49th preferred embodiment except that the chelating agent is humic acid and fulvic acid whilst the inducer is ferric sulfite.

According to a large number of experiments on the waste water samples (pH≈6.5), after a 17 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 75.4%~91.5%, 81.7%~92.3%, 82.7%~92.0%, 81.6%~91.8%, 81.9%~93.5%, 82.4%~93.5%, 76.9%~92.6%, 78.9%~92.9%, 92.3%~99.9%, 92.6%~99.9%, 92.5%~99.9%, 92.4%~99.9%, 74.8%~81.4%, 78.9%~91.4%, 72.9%~91.5%, 93.8%~99.9%, 67.6%~76.7% and 83.2%~99.9% respectively, and the $BOD_5$/COD ratio in the waste water is increased to higher than 0.430.

It is noteworthy that the mass ratio of humic acid and fulvic acid of the chelating agent is arbitrary.

According to a 78th preferred embodiment of the present invention, the water treatment agent is similar to the water treatment agent of the above 49th preferred embodiment except that the chelating agent is humic acid whilst the inducer is propylene.

According to a large number of experiments on the waste water samples (pH≈7.0), after a 17 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 75.5%~91.4%, 81.6%~92.4%, 82.6%~92.1%, 81.5%~91.7%, 81.8%~93.6%, 82.3%~93.6%, 76.8%~92.7%, 78.7%~92.8%, 92.4%~99.9%, 92.4%~99.9%, 92.8%~99.9%, 92.6%~99.9%, 75.0%~81.4%, 78.9%~91.4%, 72.8%~92.0%, 93.9%~99.9%, 67.9%~76.7% and 83.3%~99.9% respectively, and the $BOD_5$/COD ratio in the waste water is increased to higher than 0.432.

According to a 79th preferred embodiment of the present invention, the water treatment agent is similar to the water treatment agent of the above 49th preferred embodiment except that the chelating agent is fulvic acid whilst the inducer is m-trihydroxybenzene.

According to a large number of experiments on the waste water samples (pH≈7.5), after a 17 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 75.5%~91.5%, 81.9%~92.4%, 82.6%~92.4%, 81.4%~91.8%, 81.9%~93.2%, 82.3%~94.6%, 77.2%~92.7%, 78.7%~92.8%, 92.5%~99.9%, 92.4%~99.9%, 92.9%~99.9%, 92.6%~99.9%, 75.1%~81.3%, 78.9%~91.4%, 72.8%~92.0%, 93.7%~99.9%, 67.8%~76.7% and 83.2%~99.9% respectively, and the $BOD_5$/COD ratio in the waste water is increased to higher than 0.432.

According to an 80th preferred embodiment of the present invention, the water treatment agent is similar to the water treatment agent of the above 49th preferred embodiment except that the chelating agent is hydrolyzed poly maleic acid whilst the inducer is potassium arsenite.

According to a large number of experiments on the waste water samples (pH≈7.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.9%~92.4%, 81.4%~91.7%, 82.0%~94.2%, 81.3%~92.5%, 80.7%~94.4%, 80.3%~93.4%, 76.4%~91.2%, 76.4%~93.6%, 91.9%~99.9%, 91.3%~99.9%, 92.3%~99.9%, 92.1%~99.9%, 73.4%~82.1%, 78.6%~91.5%, 72.9%~92.7%, 92.9%~99.9%, 65.8%~75.9% and 82.8%~99.9% respectively, and the $BOD_5$/COD ratio in the waste water is increased to higher than 0.430.

According to an 81st preferred embodiment of the present invention, the water treatment agent is similar to the water treatment agent of the above 49th preferred embodiment except that the chelating agent is acrylic acid/acrylic ester whilst the inducer is ferric sulfite.

According to a large number of experiments on the waste water samples (pH≈7.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.8%~92.2%, 81.3%~91.5%, 82.3%~94.4%, 81.4%~91.5%, 80.5%~94.6%, 80.2%~93.7%, 76.5%~91.3%, 76.4%~93.7%, 92.0%~99.9%, 91.7%~99.9%, 92.4%~99.9%, 92.5%~99.9%, 73.9%~82.1%, 78.6%~91.5%, 72.8%~92.7%, 92.8%~99.9%, 65.8%~75.8% and 82.7%~99.9% respectively, and the $BOD_5$/COD ratio in the waste water is increased to higher than 0.430.

According to an 82nd preferred embodiment of the present invention, the water treatment agent is similar to the water treatment agent of the above 49th preferred embodiment except that the chelating agent is acrylic acid/2-methyl-2-acrylamido propyl sulfonic acid whilst the inducer is ammonium sulfide.

According to a large number of experiments on the waste water samples (pH≈7.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.4%~92.7%, 81.3%~92.7%, 82.5%~94.3%, 81.2%~92.4%, 80.7%~94.4%, 80.4%~92.6%, 75.6%~91.4%, 76.3%~93.6%~91.7%~99.9%, 91.6%~99.9%, 92.1%~99.9%, 92.6%~99.9%, 73.6%~81.9%, 78.6%~91.5%, 72.8%~92.6%, 93.3%~99.9%, 65.7%~75.8% and 82.6%~99.9% respectively, and the $BOD_5$/COD ratio in the waste water is increased to higher than 0.430.

According to an 83rd preferred embodiment of the present invention, the water treatment agent is similar to the water treatment agent of the above 49th preferred embodiment except that the chelating agent is phosphino polycarboxylic acid whilst the inducer is calcium nitrite.

According to a large number of experiments on the waste water samples (pH≈6.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.5%~91.2%, 81.6%~92.1%, 82.3%~92.6%, 81.4%~91.5%, 81.6%~93.2%, 82.7%~91.6%, 76.5%~91.6%, 76.7%~92.6%, 92.0%~99.9%, 91.8%~99.9%, 92.8%~99.9%, 92.9%~99.9%, 75.4%~81.0%, 78.2%~90.5%, 72.3%~92.6%, 92.6%~99.9%, 65.7%~73.8% and 82.7%~99.9% respectively, and the $BOD_5$/COD ratio in the waste water is increased to higher than 0.430.

According to an 84th preferred embodiment of the present invention, the water treatment agent is similar to the water treatment agent of the above 49th preferred embodiment except that the chelating agent is copolymer of phosphono and carboxylic acid whilst the inducer is tetrachloroethene.

According to a large number of experiments on the waste water samples (pH≈7.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.7%~91.0%, 81.5%~92.3%, 82.4%~92.5%, 81.4%~91.9%, 81.7%~93.4%, 82.9%~91.5%, 76.5%~91.6%, 76.7%~92.6%, 92.4%~99.9%, 91.8%~99.9%, 92.7%~99.9%, 92.9%~99.9%, 76.4%~81.2%, 78.2%~90.5%, 72.5%~92.6%, 92.9%~99.9%, 65.7%~73.8% and 82.7%~99.9% respectively, and the $BOD_5$/COD ratio in the waste water is increased to higher than 0.430.

According to an 85th preferred embodiment of the present invention, the water treatment agent is similar to the water treatment agent of the above 49th preferred embodiment except that the chelating agent is polyepoxysuccinic acid whilst the inducer is m-trihydroxybenzene.

According to a large number of experiments on the waste water samples (pH≈7.5), after a 18 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 80.7%~92.2%, 82.6%~95.1%, 83.4%~94.0%, 82.4%~92.5%, 81.3%~94.5%, 81.3%~93.7%, 75.4%~91.8%, 77.7%~93.5%, 92.3%~99.9%, 91.9%~99.9%, 92.4%~99.9%, 92.5%~99.9%, 73.8%~82.2%, 78.7%~91.5%, 72.5%~92.7%, 92.8%~99.9%, 67.5%~76.9% and 82.5%~99.9% respectively, and the $BOD_5$/COD ratio in the waste water is increased to higher than 0.430.

According to an 86th preferred embodiment of the present invention, the water treatment agent is similar to the water treatment agent of the above 49th preferred embodiment except that the chelating agent is glycin whilst the inducer is sodium arsenite.

According to a large number of experiments on the waste water samples (pH≈7.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.7%~91.6%, 81.5%~92.3%, 82.3%~92.8%, 81.3%~91.7%, 81.2%~92.7%, 81.6%~92.6%, 76.9%~90.6%, 77.8%~92.8%, 92.0%~99.9%, 91.7%~99.9%, 92.8%~99.9%, 92.1%~99.9%, 75.0%~82.2%, 78.5%~90.5%, 72.8%~91.7%, 92.6%~99.9%, 65.2%~73.3% and 82.6%~99.9% respectively, and the $BOD_5$/COD ratio in the waste water is increased to higher than 0.430.

According to an 87th preferred embodiment of the present invention, the water treatment agent is similar to the water treatment agent of the above 49th preferred embodiment except that the chelating agent is glutamic acid whilst the inducer is ferric sulfite.

According to a large number of experiments on the waste water samples (pH≈7.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.5%~92.2%, 81.7%~92.6%, 82.5%~94.1%, 81.6%~92.9%, 80.7%~94.5%, 80.3%~93.5%, 75.8%~91.4%, 76.9%~93.9%, 91.5%~99.9%, 91.8%~99.9%, 92.5%~99.9%, 92.5%~99.9%, 73.7%~82.4%, 79.5%~91.6%, 72.6%~92.9%, 92.4%~99.9%, 65.8%~75.7% and 82.3%~99.9% respectively, and the $BOD_5/COD$ ratio in the waste water is increased to higher than 0.430.

According to an 88th preferred embodiment of the present invention, the water treatment agent is similar to the water treatment agent of the above 49th preferred embodiment except that the chelating agent is aspartic acid whilst the inducer is sodium sulfide.

According to a large number of experiments on the waste water samples (pH≈8.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.0%~92.4%, 81.5%~92.3%, 82.4%~94.3%, 81.6%~92.9%, 80.7%~94.5%, 80.3%~93.5%, 75.8%~92.4%, 76.9%~93.5%, 91.5%~99.9%, 91.7%~99.9%, 92.5%~99.9%, 92.5%~99.9%, 73.7%~82.4%, 79.5%~91.6%, 72.6%~92.9%, 93.2%~99.9%, 65.9%~75.7% and 82.7%~99.9% respectively, and the $BOD_5/COD$ ratio in the waste water is increased to higher than 0.430.

According to an 89th preferred embodiment of the present invention, the water treatment agent is similar to the water treatment agent of the above 49th preferred embodiment except that the chelating agent is alanine whilst the inducer is barium nitrite.

According to a large number of experiments on the waste water samples (pH≈8.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 75.2%~91.3%, 80.1%~92.0%, 81.8%~93.4%, 81.2%~92.6%, 80.6%~94.3%, 80.0%~93.1%, 75.5%~92.4%, 76.3%~92.8%, 91.7%~99.9%, 91.4%~99.9%, 92.2%~99.9%, 92.3%~99.9%, 73.5%~82.4%, 79.5%~91.6%, 72.1%~92.9%, 93.0%~99.9%, 65.9%~75.7% and 82.5%~99.9% respectively, and the $BOD_5/COD$ ratio in the waste water is increased to higher than 0.430.

According to a 90th preferred embodiment of the present invention, the water treatment agent is similar to the water treatment agent of the above 49th preferred embodiment except that the chelating agent is phenylalanine whilst the inducer is styrene.

According to a large number of experiments on the waste water samples (pH≈8.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 75.0%~91.4%, 80.5%~92.1%, 81.6%~93.3%, 81.0%~92.2%, 80.5%~94.1%, 80.0%~93.0%, 75.3%~92.4%, 76.3%~91.8%, 91.6%~99.9%, 91.4%~99.9%, 92.2%~99.9%, 92.5%~99.9%, 73.6%~81.7%, 79.5%~91.6%, 72.4%~92.9%, 93.1%~99.9%, 65.9%~75.7% and 82.0%~99.9% respectively, and the $BOD_5/COD$ ratio in the waste water is increased to higher than 0.430.

According to a 91st preferred embodiment of the present invention, the water treatment agent is similar to the water treatment agent of the above 49th preferred embodiment except that the chelating agent is tryptophan whilst the inducer is trihydroxybenzene.

According to a large number of experiments on the waste water samples (pH≈7.0), after a 18 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 80.5%~92.2%, 82.5%~95.1%, 83.3%~93.8%, 82.6%~92.7%, 81.5%~94.7%, 80.4%~93.6%, 75.6%~91.8%, 76.5%~93.9%, 92.3%~99.9%, 91.9%~99.9%, 93.2%~99.9%, 92.6%~99.9%, 73.8%~82.4%, 78.6%~91.7%, 72.6%~92.9%, 92.8%~99.9%, 68.5%~76.9% and 82.5%~99.9% respectively, and the $BOD_5/COD$ ratio in the waste water is increased to higher than 0.430.

According to a 92nd preferred embodiment of the present invention, the water treatment agent is similar to the water treatment agent of the above 49th preferred embodiment except that the chelating agent is anion exchange resin whilst the inducer is sodium sulfite.

According to a large number of experiments on the waste water samples (pH≈7.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.4%~91.2%, 81.4%~92.0%, 82.3%~92.1%, 81.4%~91.7%, 81.6%~93.9%, 83.9%~91.5%, 76.5%~91.8%, 76.9%~93.6%, 92.5%~99.9%, 91.7%~99.9%, 92.7%~99.9%, 92.8%~99.9%, 76.5%~81.2%, 78.6%~90.5%, 72.1%~92.9%, 92.9%~99.9%, 65.9%~73.6% and 82.4%~99.9% respectively, and the $BOD_5/COD$ ratio in the waste water is increased to higher than 0.430.

According to a 93rd preferred embodiment of the present invention, the water treatment agent is similar to the water treatment agent of the above 49th preferred embodiment except that the chelating agent is anion exchange resin whilst the inducer is sodium sulfite.

According to a large number of experiments on the waste water samples (pH≈7.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.0%~91.3%, 81.0%~91.8%, 82.0%~92.4%, 81.5%~91.7%, 81.9%~93.9%, 83.5%~91.6%, 76.9%~91.5%, 76.7%~93.5%, 92.5%~99.9%, 91.5%~99.9%, 92.6%~99.9%, 92.8%~99.9%, 76.5%~81.2%, 78.9%~90.5%, 72.5%~92.9%, 92.7%~99.9%, 65.7%~74.6% and 82.5%~99.9% respectively, and the $BOD_5$/COD ratio in the waste water is increased to higher than 0.430.

According to a 94th preferred embodiment of the present invention, the water treatment agent is similar to the water treatment agent of the above 49th preferred embodiment except that the chelating agent is algae whilst the inducer is dichloroethene.

According to a large number of experiments on the waste water samples (pH≈7.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.1%~91.5%, 81.2%~91.5%, 82.3%~92.5%, 81.4%~91.9%, 81.7%~93.5%, 83.5%~91.2%, 76.9%~91.5%, 76.6%~93.0%, 92.6%~99.9%, 91.2%~99.9%, 92.9%~99.9%, 92.5%~99.9%, 75.5%~81.2%, 78.7%~90.5%, 72.6%~92.9%, 91.6%~99.9%, 66.7%~74.5% and 83.5%~99.9% respectively, and the $BOD_5$/COD ratio in the waste water is increased to higher than 0.430.

It is worth mentioning that the introduction of algae (such as chrysophyte, chladophora and spirogyra) which has water treatment ability can further enhance the efficacy.

According to a 95th preferred embodiment of the present invention, the water treatment agent is similar to the water treatment agent of the above fifth preferred embodiment except that the chelating agent is algae.

According to a large number of experiments on the waste water samples (pH≈7.5), after a 30 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 74.5%~89.5%, 81.5%~90.0%, 81.6%~90.1%, 81.9%~90.5%, 85.7%~95.4%, 74.3%~90.1%, 75.6%~89.4%, 75.5%~90.0%, 92.2%~99.9%, 92.2%~99.9%, 91.7%~99.9%, 92.3%~99.9%, 71.5%~81.0%, 74.2%~90.0%, 71.9%~90.0%, 93.4%~99.9%, 54.6%~72.03% and 82.6%~99.9% respectively, and the $BOD_5$/COD ratio in the waste water is increased to higher than 0.418.

It is noteworthy that the introduction of algae (such as chrysophyte, chladophora and spirogyra) which has water treatment ability can further enhance the efficacy.

According to a 96th preferred embodiment of the present invention, the water treatment agent is similar to the water treatment agent of the above 49th preferred embodiment except that the chelating agent is polyoxometallate whilst the inducer is 2-naphthol.

According to a large number of experiments on the waste water samples (pH≈7.0), after a 18 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 76.1%~92.0%, 81.4%~92.1%, 82.2%~94.3%, 81.8%~92.7%, 80.9%~94.7%, 80.5%~93.7%, 76.8%~92.7%, 76.7%~93.6%, 91.5%~99.9%, 91.7%~99.9%, 92.5%~99.9%, 92.8%~99.9%, 73.9%~82.4%, 79.8%~91.6%, 72.9%~92.9%, 93.1%~99.9%, 66.9%~75.87% and 82.9%~99.9% respectively, and the $BOD_5$/COD ratio in the waste water is increased to higher than 0.430.

According to a 97th preferred embodiment of the present invention, the water treatment agent is similar to the water treatment agent of the above fifth preferred embodiment except that the chelating agent is activated carbon with carboxyl functional group on the surface thereof.

According to a large number of experiments on the waste water samples (pH≈6.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by at least 70.0%, 80.0%, 81.5%, 80.0%, 80.0%, 75%, 70.0%, 75%, 92%, 90.0%, 91.0%, 90.0%, 70.0%, 75%, 70.0%, 90.0%, 63.0% and 80.0% respectively, and the $BOD_5$/COD ratio in the waste water is increased to higher than 0.418.

According to a 98th preferred embodiment of the present invention, the water treatment agent is similar to the water treatment agent of the above fifth preferred embodiment except that the chelating agent is activated carbon with hydroxyl functional group on the surface thereof.

According to a large number of experiments on the waste water samples (pH≈7.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by at least 70.0%, 80.0%, 81.5%, 80.0%, 80.0%, 75%, 70.0%, 75%, 90.0%, 92.0%, 90.0%, 91.0%, 70.0%, 75%, 72.0%, 90.0%, 60.0% and 80.0% respectively, and the $BOD_5$/COD ratio in the waste water is increased to higher than 0.418.

According to a 99th preferred embodiment of the present invention, the water treatment agent is similar to the water treatment agent of the above fifth preferred embodiment except that the chelating agent is selected from the group consisting of activated carbon with carbonyl functional group on the surface thereof, activated carbon with alcohol functional group on the surface thereof, activated carbon with pyrrolidinyl functional group on the surface thereof, activated carbon with furan functional group on the surface thereof and activated carbon with pyridyl functional group on the surface thereof.

According to a large number of experiments on the waste water samples (pH≈7.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by at least 70.0%, 80.0%, 81.5%, 80.0%, 80.0%, 75%, 70.0%, 75%, 90%, 90.0%, 90.0%, 90.0%, 70.0%, 75%, 70.0%, 90.0%, 60.0% and 80.0% respectively, and the $BOD_5/COD$ ratio in the waste water is increased to higher than 0.418.

According to a 100th preferred embodiment of the present invention, the water treatment agent is similar to the water treatment agent of the above 49th preferred embodiment except that the chelating agent is activated carbon with carboxyl functional group on the surface thereof whilst the inducer is 1-naphthol.

According to a large number of experiments on the waste water samples (pH≈7.0), after a 18 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 80.5%~92.6%, 82.4%~95.2%, 83.5%~94.1%, 82.4%~92.3%, 81.6%~94.3%, 81.5%~93.8%, 75.9%~92.3%, 77.5%~93.4%, 92.6%~99.9%, 91.5%~99.9%, 92.6%~99.9%, 92.8%~99.9%, 73.9%~82.2%, 78.7%~91.8%, 72.8%~92.5%, 92.9%~99.9%, 67.5%~77.9% and 82.4%~99.9% respectively, and the $BOD_5/COD$ ratio in the waste water is increased to higher than 0.418.

According to a 101st preferred embodiment of the present invention, the water treatment agent is similar to the water treatment agent of the above 49th preferred embodiment except that the chelating agent is activated carbon with hydroxyl functional group on the surface thereof whilst the inducer is m-hydroquinonee.

According to a large number of experiments on the waste water samples (pH≈6.5), after a 18 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, stradiol, estrone, nitrophenol, chloramine, aniline, triclosan, pyrene, and carbamazepine are reduced by 81.7%~92.2%, 82.7%~95.3%, 83.7%~94.3%, 82.6%~92.4%, 81.3%~94.5%, 81.3%~93.7%, 75.4%~91.8%, 77.8%~93.6%, 92.7%~99.9%, 91.9%~99.9%, 92.6%~99.9%, 92.5%~99.9%, 73.8%~82.5%, 78.9%~91.4%, 72.6%~92.8%, 92.6%~99.9%, 67.8%~76.9% and 82.7%~99.9% respectively, and the $BOD_5/COD$ ratio in the waste water is increased to higher than 0.430.

According to a 102nd preferred embodiment of the present invention, the water treatment agent is similar to the water treatment agent of the above 49th preferred embodiment except that the chelating agent is activated carbon with carbonyl functional group on the surface thereof whilst the inducer is ferric arsenite.

According to a large number of experiments on the waste water samples (pH≈7.0), after a 18 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 81.5%~92.4%, 82.6%~95.5%, 83.5%~94.6%, 82.7%~92.6%, 81.5%~95.0%, 81.2%~93.4%, 75.5%~91.9%, 77.5%~93.6%, 92.8%~99.9%, 91.7%~99.9%, 92.5%~99.9%, 92.4%~99.9%, 73.9%~83.5%, 78.7%~91.4%, 72.6%~92.4%, 92.7%~99.9%, 67.9%~76.8% and 82.5%~99.9% respectively, and the $BOD_5/COD$ ratio in the waste water is increased to higher than 0.430.

According to a 103rd preferred embodiment of the present invention, the water treatment agent is similar to the water treatment agent of the above 49th preferred embodiment except that the chelating agent is activated carbon with alcohol functional group on the surface thereof whilst the inducer is sodium sulfite.

According to a large number of experiments on the waste water samples (pH≈7.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 81.4%~92.0%, 82.4%~95.4%, 83.7%~94.6%, 82.8%~92.5%, 81.0%~93.5%, 81.0%~93.2%, 75.2%~91.3%, 77.1%~93.2%, 92.5%~99.9%, 91.6%~99.9%, 92.2%~99.9%, 92.4%~99.9%, 73.5%~82.2%, 78.9%~91.3%, 72.4%~92.6%, 92.7%~99.9%, 67.8%~76.9% and 82.6%~99.9% respectively, and the $BOD_5/COD$ ratio in the waste water is increased to higher than 0.430.

According to a 104th preferred embodiment of the present invention, the water treatment agent is similar to the water treatment agent of the above 49th preferred embodiment except that the chelating agent is activated carbon with pyrrolidinyl functional group on the surface thereof whilst the inducer is sodium sulfide.

According to a large number of experiments on the waste water samples (pH≈6.0), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 81.5%~92.1%, 82.7%~95.3%, 83.8%~94.4%, 82.7%~92.5%, 81.0%~94.3%, 81.1%~93.2%, 75.4%~91.7%, 77.0%~93.2%, 92.7%~99.9%, 91.8%~99.9%, 92.5%~99.9%, 92.6%~99.9%, 74.0%~82.5%, 78.2%~91.6%, 72.7%~92.5%, 92.7%~99.9%, 68.2%~76.9% and 82.2%~99.9% respectively, and the $BOD_5/COD$ ratio in the waste water is increased to higher than 0.430.

According to a 105th preferred embodiment of the present invention, the water treatment agent is similar to the water treatment agent of the above 49th preferred embodiment except that the chelating agent is activated carbon with furan functional group on the surface thereof whilst the inducer is potassium nitrite.

According to a large number of experiments on the waste water samples (pH≈6.5), after a 20 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 82.4%~93.1%, 83.0%~95.8%, 83.9%~94.7%, 82.7%~92.8%, 81.7%~94.6%, 81.2%~93.5%, 75.8%~91.8%, 78.1%~93.8%, 92.8%~99.9%, 92.0%~99.9%, 92.8%~99.9%, 92.5%~99.9%, 73.8%~82.5%, 77.8%~91.6%, 72.5%~93.0%, 92.7%~99.9%, 69.1%~77.5% and 82.5%~99.9% respectively, and the $BOD_5$/COD ratio in the waste water is increased to higher than 0.430.

According to a 106th preferred embodiment of the present invention, the water treatment agent is similar to the water treatment agent of the above 49th preferred embodiment except that the chelating agent is activated carbon with pyridyl functional group on the surface thereof whilst the inducer is potassium arsenite.

According to a large number of experiments on the waste water samples (pH≈7.0), after a 18 min sufficient interaction with the water treatment agent according to this preferred embodiment of the present invention, the concentrations of phenol, 2-chlorophenol, 3-chlorophenol, 4-chlorophenol, 2,4-dichlorophenol, 2,4,6-trichlorophenol, pentachlorophenol, p-hydroxybenzoic acid, bisphenol A, nonylphenol, estradiol, estrone, nitrophenol, chloramine, aniline, triclosan, pyrene, and carbamazepine are reduced by 80.9%~91.8%, 82.0%~95.4%, 83.4%~94.5%, 82.0%~92.4%, 81.2%~94.8%, 81.5%~94.7%, 75.3%~92.0%, 77.8%~93.7%, 92.8%~99.9%, 91.5%~99.9%, 92.2%~99.9%, 92.0%~99.9%, 74.1%~82.6%, 78.2%~91.5%, 73.2%~92.4%, 92.8%~99.9%, 67.6%~76.9% and 81.8%~99.9% respectively, and the $BOD_5$/COD ratio in the waste water is increased to higher than 0.430.

What is claimed is:

1. A water treatment agent for removing pollutant by reinforcing potassium permanganate with intermediate manganese, consisting of: a potassium permanganate and a chelating agent and an inducer, wherein a mass ratio of said potassium permanganate and said, chelating agent and said inducer is 1:0.5~50:0.1~1.

2. The water treatment agent, as recited in claim 1, wherein said inducer is selected from a group consisting of arsenite, sulfide, nitrite, styrene, ethylene, propylene, butylene, trichloroethene, dichloroethene, tetrachloroethene, o-hydroquinone, p-hydroquinone, m-hydroquinonee, 1-naphthol, 2-naphthol, m-trihydroxybenzene, m-trihydroxybenzene, and trihydrozybenzene.

3. The water treatment agent, as recited in claim 2, wherein said chelating agent is selected from a group consisting of inorganic chelating agent, micromolecule carboxylic acid, amino acid, aminopolycarboxylate, macromolecular carboxylic acid, synthetic macromolecular chelating agent, algae, polyoxometalate, activated carbon with carboxyl functional group on the surface thereof, activated carbon with hydroxyl group on the surface thereof, activated carbon with carbonyl functional group on the surface thereof, activated carbon with alcohol functional group on the surface thereof, activated carbon with pyrrolidinyl functional group on the surface thereof, activated carbon with furan functional group on the surface thereof, activated carbon with pyridyl functional group on the surface thereof, and anion exchange resin.

4. The water treatment agent, as recited in claim 3, wherein said chelating agent is selected from a group consisting of phosphate, pyrophosphate and polyphosphate.

5. The water treatment agent, as recited in claim 3, wherein said inorganic chelating agent is comprises phosphate pyrophosphate and polyphosphate.

6. The water treatment agent, as recited in claim 3, wherein said micromolecule carboxylic acid is selected from a group consisting of oxalic acid, citric acid, tartaric acid, malonic acid, succinic acid, benzonic acid, salicylic acid,phthalic acid, sulfosalicylic acid, maleic acid, fumaric acid, gallic acid, tannic acid, and a combination thereof.

7. The water treatment agent, as recited in claim 3, wherein said aminopolycarboxtlate is seleced from a group consisting of ethylenediaminetetraacetic acid, cyclohexane diamine tetraacetic acid, nitrilotriacetic acid, ethylene glycol tetraacetic acid, ethylenediaminetetraacetic acid, triethylenetetramine, ethylene diamine disuccinic acid, deithylene triamine pentaacetic and the combination thereof.

8. The water treatment agant, as recited in claim 3, wherein said macromolecular carboxylic acid is selected from a group consisting of humic acid, fulvic acid and alginic acid.

9. The water treatment agent, as recited in claim 3, wherein said macromolecular carboxylic acid comprises humic acid, fulvic acid, and alginic acid.

10. The water treatment agent, as recited in claim 3, wherein said synthetic macromolecule chelating agent is selected from a group consisting of hydrolyted poly maleic acid, acrylic acid, acrylic acid/acrylic ester, acrylic acid/2-methyl-2acrylamido propyl sulfonic acid copolymer of phosphono and carboxylic acid, phosphino polycarboxylic acid, polyepoxysuccinic acid, polyaspartic.

* * * * *